United States Patent [19]
Richards

[11] Patent Number: 6,163,336
[45] Date of Patent: Dec. 19, 2000

[54] TRACKING SYSTEM FOR STEREOSCOPIC DISPLAY SYSTEMS

[76] Inventor: Angus Duncan Richards, 30 Koolan Dr., Shelley, Australia, 6017

[21] Appl. No.: 08/849,777

[22] PCT Filed: Dec. 13, 1995

[86] PCT No.: PCT/AU95/00843

§ 371 Date: Dec. 23, 1997

§ 102(e) Date: Dec. 23, 1997

[87] PCT Pub. No.: WO96/18925

PCT Pub. Date: Jun. 20, 1996

(Under 37 CFR 1.47)

[30] Foreign Application Priority Data

Dec. 13, 1994 [AU] Australia .................................. PN0038

[51] Int. Cl.[7] .......................... H04N 13/00; H04N 13/04; H04N 15/00
[52] U.S. Cl. ................................................ 348/42; 348/51
[58] Field of Search ............................ 348/42–43, 47–48, 348/51, 53, 58–59, 169, 176, 180; 345/9, 31–32, 139; 359/376, 452–464, 619; 349/15, 61, 95, 112

[56] References Cited

U.S. PATENT DOCUMENTS

| 2,727,429 | 12/1955 | Jenkins . | |
|---|---|---|---|
| 4,100,572 | 7/1978 | Perisic . | |
| 4,315,240 | 2/1982 | Spooner . | |
| 5,024,521 | 6/1991 | Zuchowski et al. | 352/86 |
| 5,189,452 | 2/1993 | Hodson et al. . | |
| 5,223,925 | 6/1993 | Hattori | 348/48 |
| 5,311,220 | 5/1994 | Eichenlaub . | |
| 5,320,538 | 6/1994 | Baum . | |
| 5,329,323 | 7/1994 | Biles | 353/10 |
| 5,349,379 | 9/1994 | Eichenlaub . | |
| 5,483,308 | 1/1996 | Youngker et al. . | |
| 5,589,980 | 12/1996 | Bass et al. | 359/478 |
| 5,661,599 | 8/1997 | Borner . | |
| 5,774,175 | 6/1998 | Hattori | 348/55 |
| 5,956,180 | 9/1999 | Bass et al. | 359/479 |
| 6,069,649 | 5/2000 | Hattori | 348/51 |

FOREIGN PATENT DOCUMENTS

| 0 354 851 A2 | 8/1989 | European Pat. Off. | H04N 13/04 |
|---|---|---|---|
| 0601308 | 6/1994 | European Pat. Off. | H04N 13/04 |
| 0607000 | 7/1994 | European Pat. Off. | G06F 15/72 |
| 63-018213 | 1/1988 | Japan | G01B 11/00 |
| 63-121387 | 5/1988 | Japan | H04N 13/04 |

(List continued on next page.)

OTHER PUBLICATIONS

Petro Vlahos "The Front Projection Process of Composite Photography", British Kinematography Sound and Television, vol. 54, Jan. 1972, pp. 14–19.

Patent Abstract of Japan, P–869, p. 83, JP 1–21435 A (Sony Corp) Jan. 24, 1989.

"Head Tracking Stereoscopic Display", *IEEE Transactions on Electron Devices*, vol. Ed–33, No. 8, Aug. 1986, p. 1123–1127.

Holmes, "3D TV Without Glasses", IEEE AES Magazine, vol. 16, Issue 9, Sep. 1991, pp. 20–25.

McCartney et al, "Autostereoscopic 3D Imaging Systems for Telecommunications Applications", IEE Colloquium on Stereoscopic Television, 1992, pp. 8/1 to 8/6.

Moore et al, "The Implementation of a Multi–View Autostereoscopic Display", IEE Colloquium on Stereoscopic Television, 1992, pp. 4/1 to 4/16.

*Primary Examiner*—Vu Le
*Attorney, Agent, or Firm*—Fredrikson & Byron, PA

[57] ABSTRACT

A tracking system for tracking a viewer of an auto-stereoscopic display system including means to locate the position of the head and/or eyes of the viewer relative to the auto-stereoscopic display system. The auto-stereoscopic display system may provide a stereoscopic image including left and right image fields, the tracking system being adapted to position the image fields to thereby at least substantially correspond with the position of the eyes of the viewer. The tracking may be in at least one direction.

46 Claims, 24 Drawing Sheets

FOREIGN PATENT DOCUMENTS

| | | | |
|---|---|---|---|
| 2 041 562 | 12/1979 | United Kingdom | G02B 27/00 |
| 2 041 563 | 12/1979 | United Kingdom | G02B 27/00 |
| 2 155 178 | 12/1979 | United Kingdom | G03B 21/60 |
| 2 201 069 | 1/1988 | United Kingdom | H04N 13/04 |
| 2 259 213 | 8/1991 | United Kingdom | G09B 9/32 |
| PCT/GB94/00405 | 3/1994 | WIPO | H04N 13/04 |
| WO94/06249 | 3/1994 | WIPO | H04N 13/04 |
| WO94/24601 | 10/1994 | WIPO | G02B 27/22 |
| WO94/25899 | 11/1994 | WIPO | H04N 13/04 |
| WO96/18925 | 6/1996 | WIPO | G02B 27/22 |

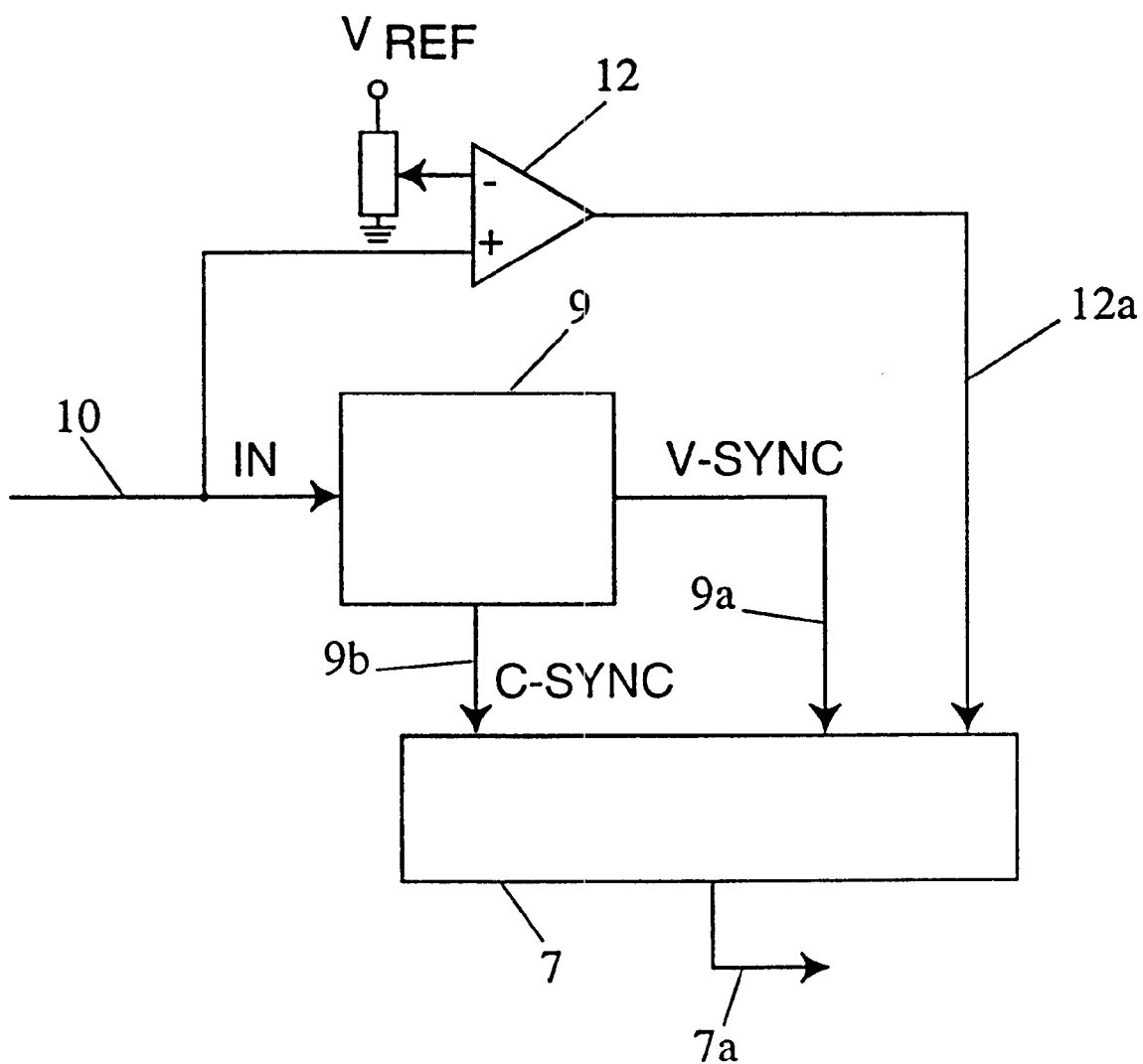

Fig 3a.
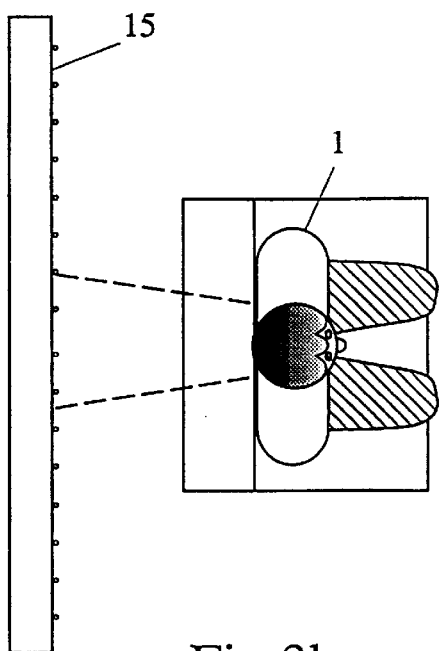 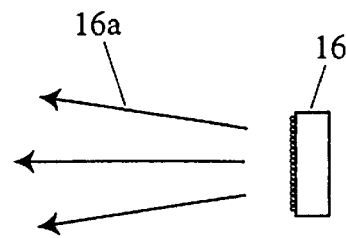
Fig 3b.
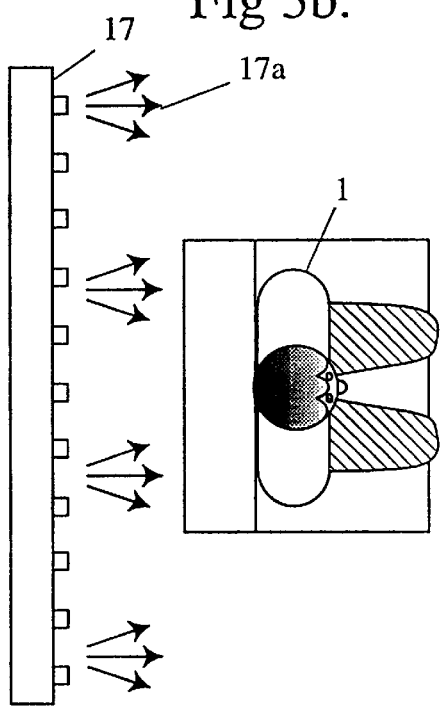 
Fig 3c.
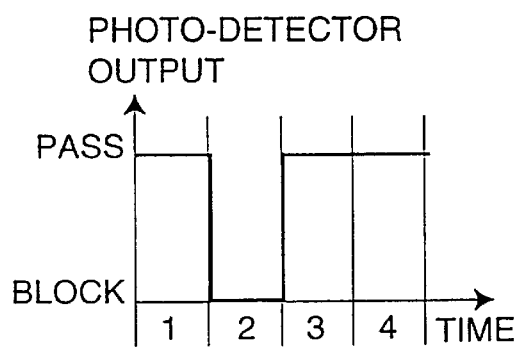

Fig 24.
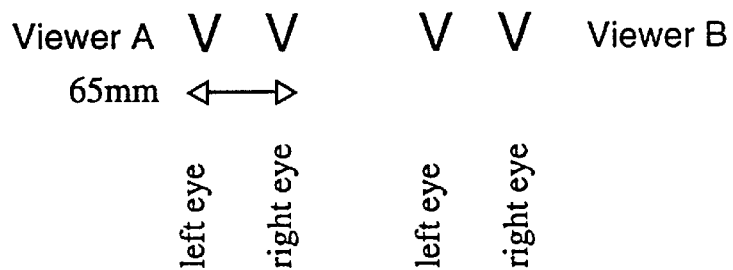
Fig 25.
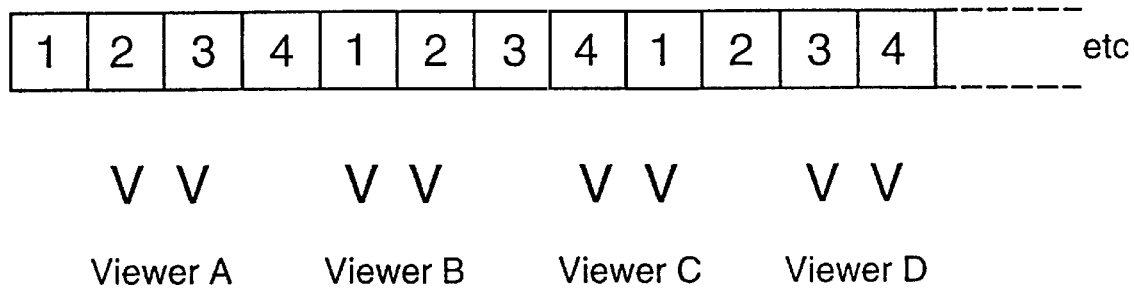
Fig 26.
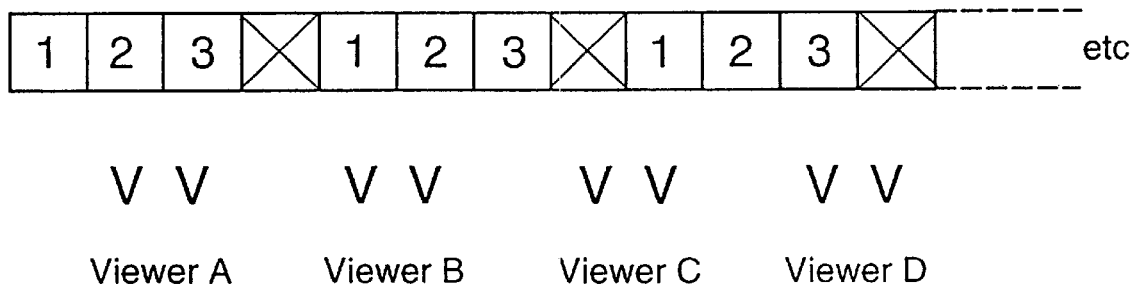

TRACKING SYSTEM FOR STEREOSCOPIC DISPLAY SYSTEMS

The present invention is generally directed to stereoscopic display systems for providing a three dimensional (3D) image to a viewer. Systems which allow the 3D image to be viewed with the naked eye are known as "autostereoscopic" display systems. More specifically, the present invention is directed to a tracking system for use in such systems.

There are two main classes of functional autostereoscopic 3D display systems. These are multi-image and stereo-pair type displays.

Both of these display systems rely on the principle of presenting several images that are viewable only in particular spatial positions. The object being that the individual images are only perceived by one eye of the viewer at a time. That is to say, the left eye sees one image and the right eye sees the other.

The location and arrangement of these spatial positions and the method of presentation varies greatly between the different systems.

Multi-image displays rely on the "interleaving" of the different images into a single display medium. These images are then "decoded" or "unscrambled" by virtue of the differential viewing angles subtended between the viewer's eyes and the screen i.e. by a virtue of the horizontal displacement between the eyes of the viewer a different image will be presented to each eye.

The simplest implementation consists of a technique producing a repeating sequence of left-right images as illustrated in FIG. 24. The distance between each successive image is 65 mm which is equal to the average distance between the viewers eyes. Therefore, a viewer located at position A will see a correctly sequenced 3D image.

However, should the viewer move laterally more than 32 mm, or be at position B, then the left image will be seen by the right eye and the right image by the left eye i.e. the viewer sees a "reverse 3D" image. The reverse 3D image is very uncomfortable to view and after a short while causes viewer distress i.e. headache. In practice, when first sitting down to view such a system it is difficult for the viewer to determine if a correct or reverse 3D image is being viewed. It is not until discomfort is felt that the viewer is aware of being incorrectly positioned.

Additionally, it is difficult for the viewer to maintain the correct viewing position for an extended period of time.

Most multi-image auto-stereoscopic systems have this shortcoming. In particular systems those based upon lenticular lenses and grid type image separators.

Consider now an improvement to this system whereby a number of images 1,2,3,4 each spaced 65 mm apart are presented such that each of the images displayed has a different "perspective" or "view" as per FIG. 25.

In a properly designed system the viewable regions would be placed such that the viewer's eyes would fall across 1 and 2 (i.e. left eye would see image 1, right eye would see image 2) as for the viewer at position B. However, if the viewer were to move to the left to position A then the viewer's eyes would fall across images 2 and 3. However, as the images 2 and 3 also show stereo disparity (with regard to each other) a correct 3D image is still viewable. Similarly a viewer at position D will also view a 3D image. The pattern of images repeats 1,2,3,4,1,2,3,4 so a familiar situation exists in a number of viewable locations thus making the system truly multi-viewer. However, this is where a problem arises. Because the pattern repeats, if the viewer moves to position C then the left eye will see image 4 and the right eye will see image 1. The problem here is that when the video or other media was produced it was done so with camera 4 to the right of camera 1. So as a result the image is viewed from this position the stereo-disparity is reversed and reverse 3D is displayed.

This problem can be significantly overcome by introducing a null or black field as one of the images (for example making image 4 a black field as per FIG. 26. This eliminates the problem of reverse 3D by ensuring that at the cross-over between one pattern and the next repeated pattern, one of the viewer's eyes is always in a null region. When in one of these regions the viewer will still be able to view an image out of one eye only but only in 2D. The main undesirable side-effect of this technique is that it introduces 2 regions, at viewer positions C and D, in which the 3D effect is lost where there was only one before. This means that for a 3 projector system with one null field 3D will only be viewable in 50% of the locations. For a 4 projector system with one null field 60% of the locations will be viewable. As can be seen, in order for the system to be effective a large number of different views are required. The more views there are, the better the display works. The number of images that comprise the "interleaved" image is typically in the range of 4 to 16. Eight (8) seems to be more or less the practical minimum for an acceptable consistency of image. The spacing between the viewable locations of the images is no greater than 1 eye spacing (65 mm) and is usually less (typically ½ this value).

There are several methods by which the images can be "interleaved" and "decoded". These vary greatly in complexity, cost and performance. An ideal encoder/decoder system will:

1) be viewable from any vertical angle
2) have a perfectly sharp transition between the images
3) be viewable from any distance
4) not degrade the displayed image (due to chromatic aberration or other undesirable optical characteristics)
5) the image pattern must repeat.

Although in theory it is possible to construct a display that is viewable from any distance, in practice all of the displays of this class have an optimal pre-defined viewing distance.

The simplest of the systems is one using a vertically oriented array of lines forming a grid. This system is viewable from any vertical angle, is simple and inexpensive to fabricate but has the fundamental problems that the transitions between the images are not sharp and always cause some form of image degradation due to occlusion, diffraction or moire fringing.

Lenticular lenses solve the problems of image transition sharpness and the aforementioned image degradations but unfortunately introduce a range of new image degradations such as chromatic aberration and band-reflection. There has been a great deal of interest recently in lenticular lens displays and several major companies are actively pursuing them regardless of the inherent problems associated with this approach.

Stereo-pair type displays require only two separate images for the generation of a stereoscopic image. This results in a significant reduction in the volume of information required to operate the display. This is of prime concern as it has direct economic and technical relevance in the fields of filming/recording, transmitting, editing and generation of the images.

A stereo-pair type display can be thought of as a multi-image display comprising of only two images. Because of the limited number of different "views" the systems have very poor tolerance to viewer movement. The exact performance characteristics depend upon the optical principles being employed, be they grids, lenticular arrays, or retroreflective mirror combinations and whether the "views" repeat and/or have null-fields (black "views") inserted into the pattern.

Because of the limited number of different "views" a static system will, at best, be viewable in correct 3D in only 50% of the viewable regions for the display, with reverse 3D being present in the other 50% of the viewable regions, or in the case of a system utilising null-fields only 33% of the locations will be viewable in correct 3D with the other 67% being viewable in monoscopic mode only.

Even utilising the best of the various optical techniques available, the viewer is constrained within a 65 mm wide window of lateral viewability, i.e., the viewer must stay within 32 mm of the centre of a view region in order to maintain the correct 3D effect.

The key to solving this problem of viewer constraint is to provide a means by which a tracking system is "aware" of the position of the viewer and thus can instruct the display unit to move the position of the displayed images or "views" so that they always correspond to the correct position of the viewer's eyes, i.e., the left image is always viewed by the left eye and the right image is always viewed by the right eye.

With this in mind, the present invention provides a tracking system for tracking a viewer of an auto-stereoscopic display system including means to locate the position of the head and/or eyes of the viewer relative to the auto-stereoscopic display system.

The auto-stereoscopic display system may provide a stereoscopic image including left and right image fields and the tracking system may be adapted to position the image fields to thereby at least substantially correspond with the position of the eyes of the viewer.

The inclusion of such a system makes all of aforementioned stereo-pair systems viable and improves the performance of multiple image displays by avoiding reverse 3D regions becoming viewable.

The control of the position of the images of "views" can be performed either mechanically, or electronically and is dependent upon the type of stereo-pair system utilised.

Viewer tracking can be in one, two or three dimensions although in most cases only tracking in the horizontal axis is required.

To provide a better understanding of the present invention, reference is made to the accompanying drawings which illustrate preferred embodiments of the present invention.

In the drawings:

FIGS. 1 (a) and (b) show plan views of an arrangement of a tracking system using image-analysis techniques according to the present invention;

FIG. 2 is a circuit diagram showing a thresholding circuit according to the present invention;

FIGS. 3(a) and 3(b) are respective plan views of arrangements of tracking systems using shadow screen techniques according to the present invention;

Figure 12:
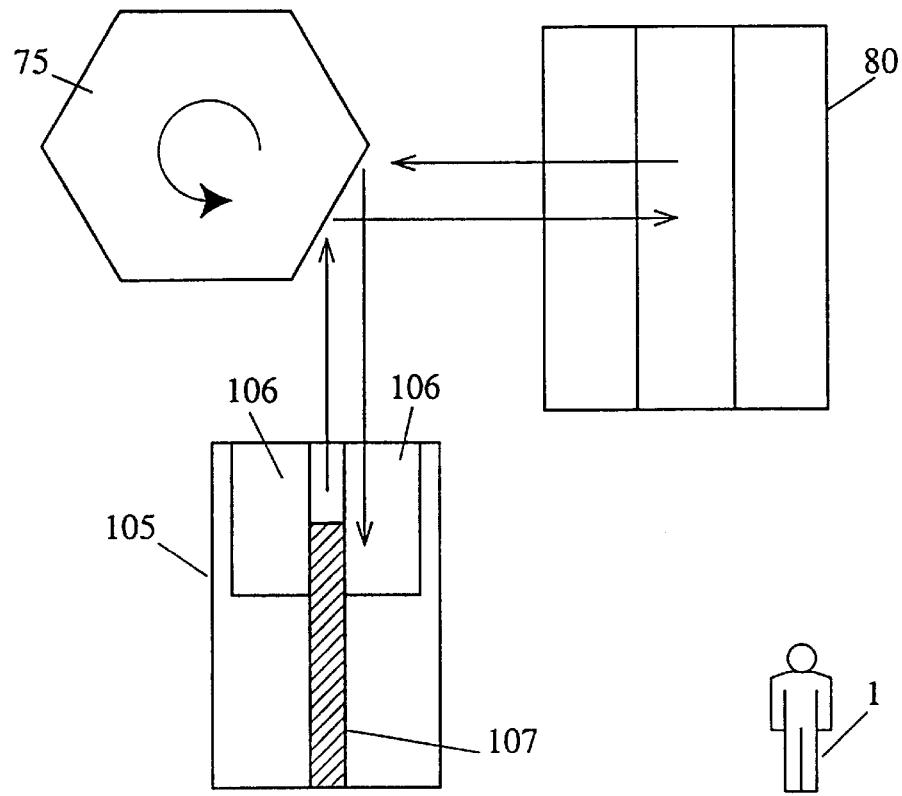
Figure 13A:
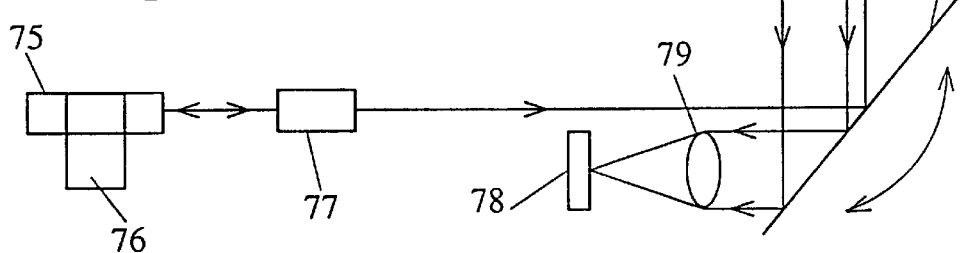
Figure 13B:
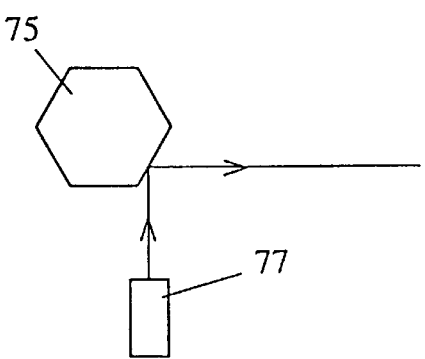
Figure 14A:
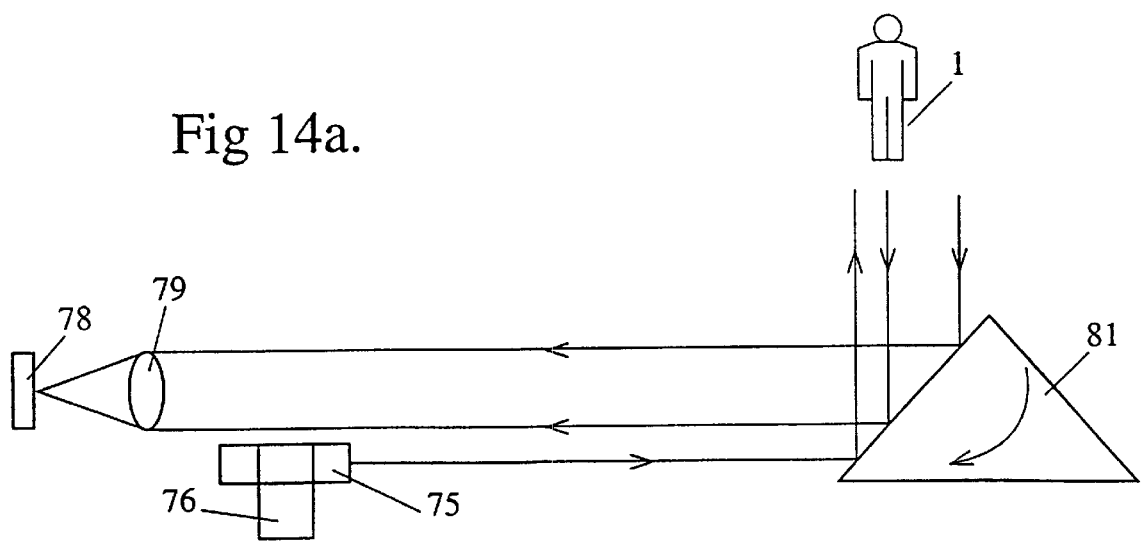
Figure 14B:
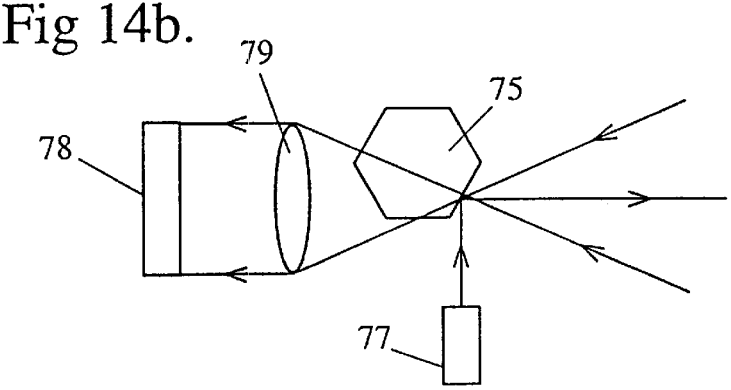
Figure 15A:
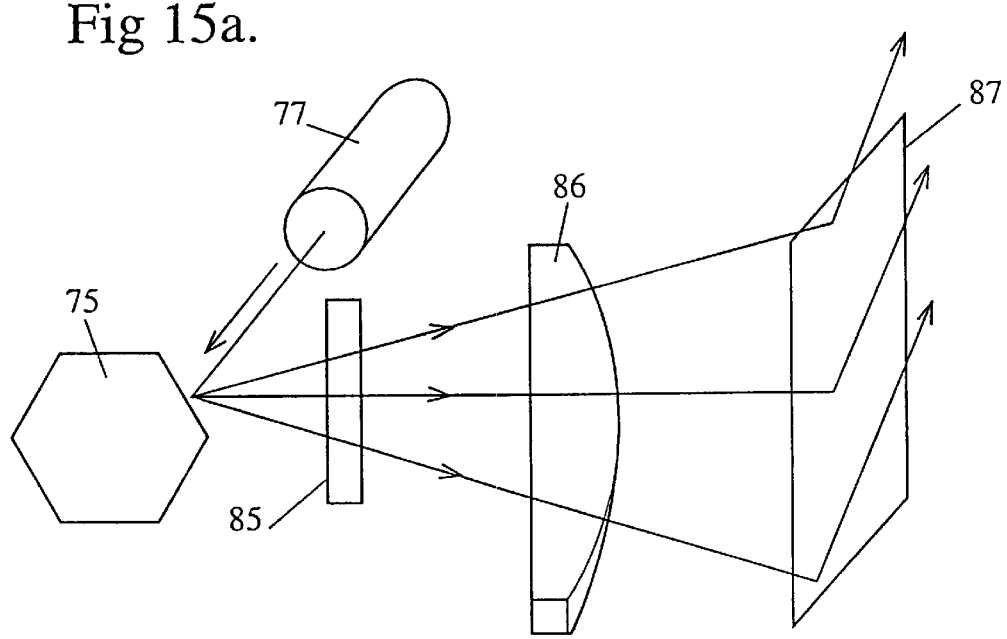
Figure 15B:
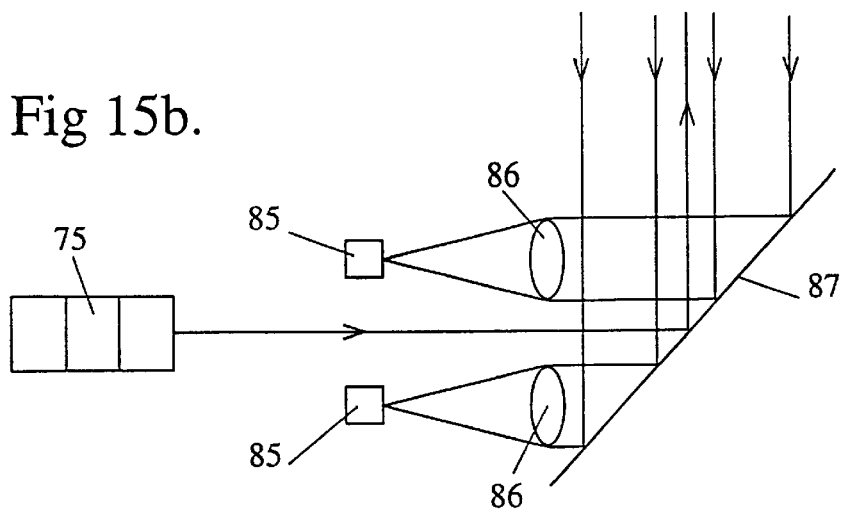
Figure 16A:
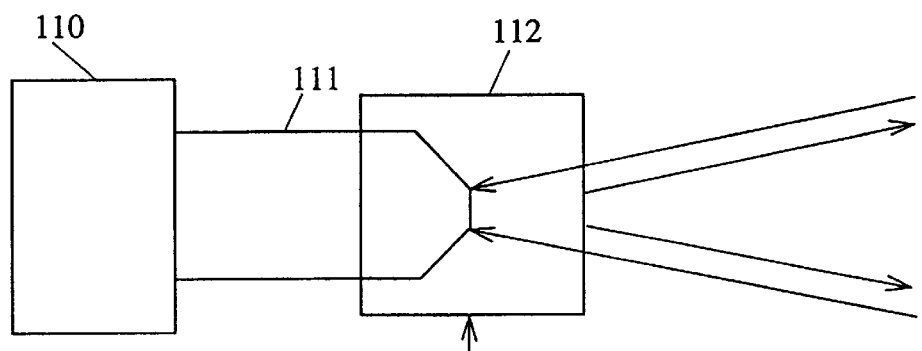
Figure 16B:
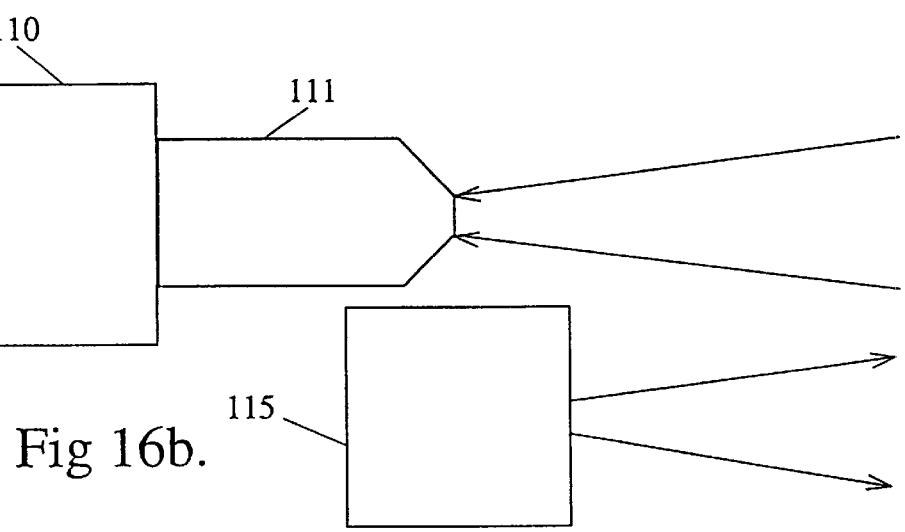
Figure 17A:
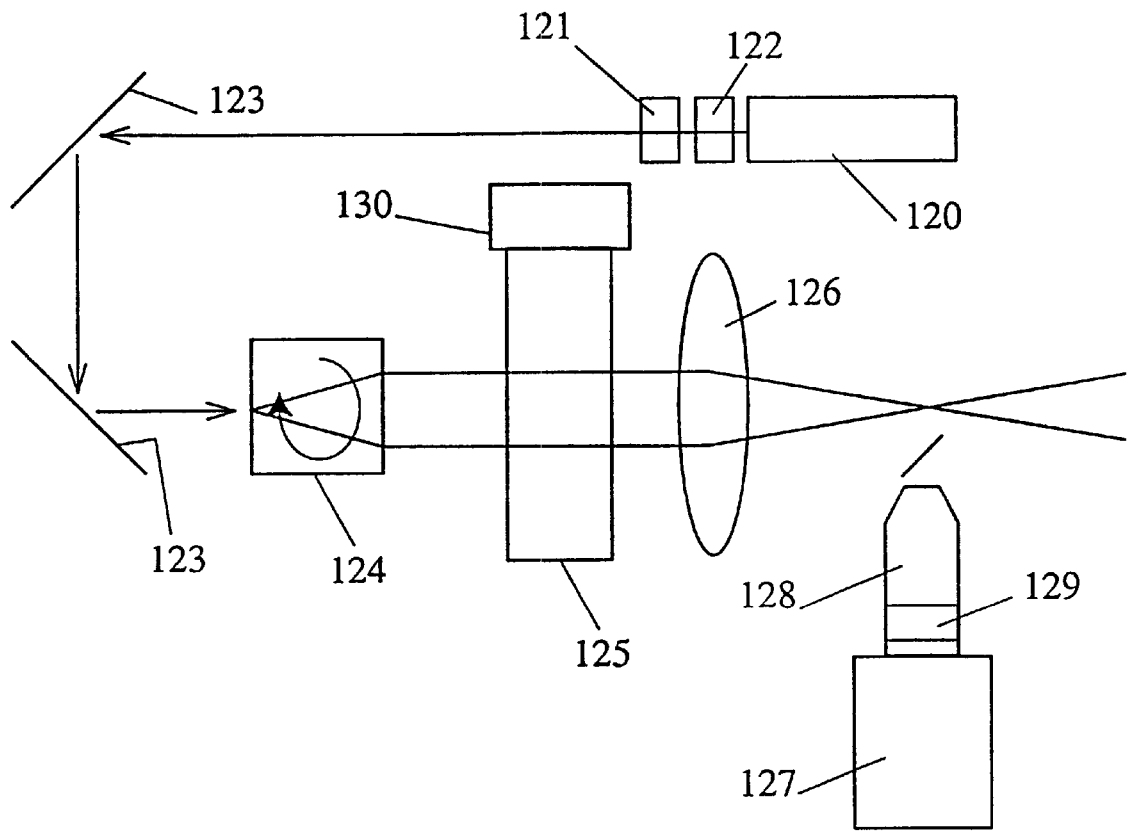
Figure 17B:
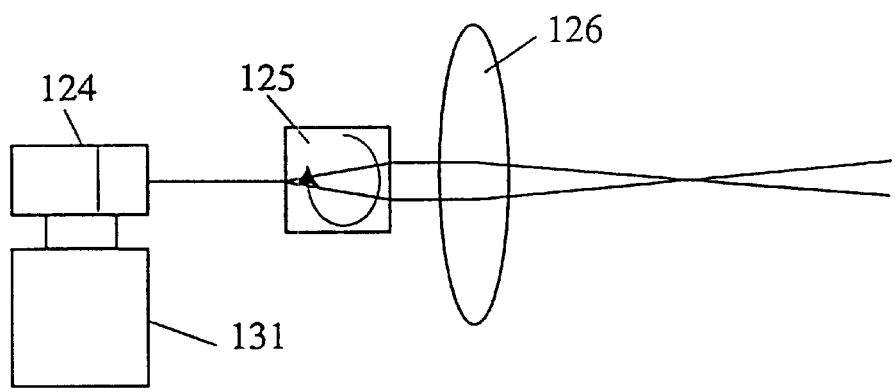
Figure 18A:
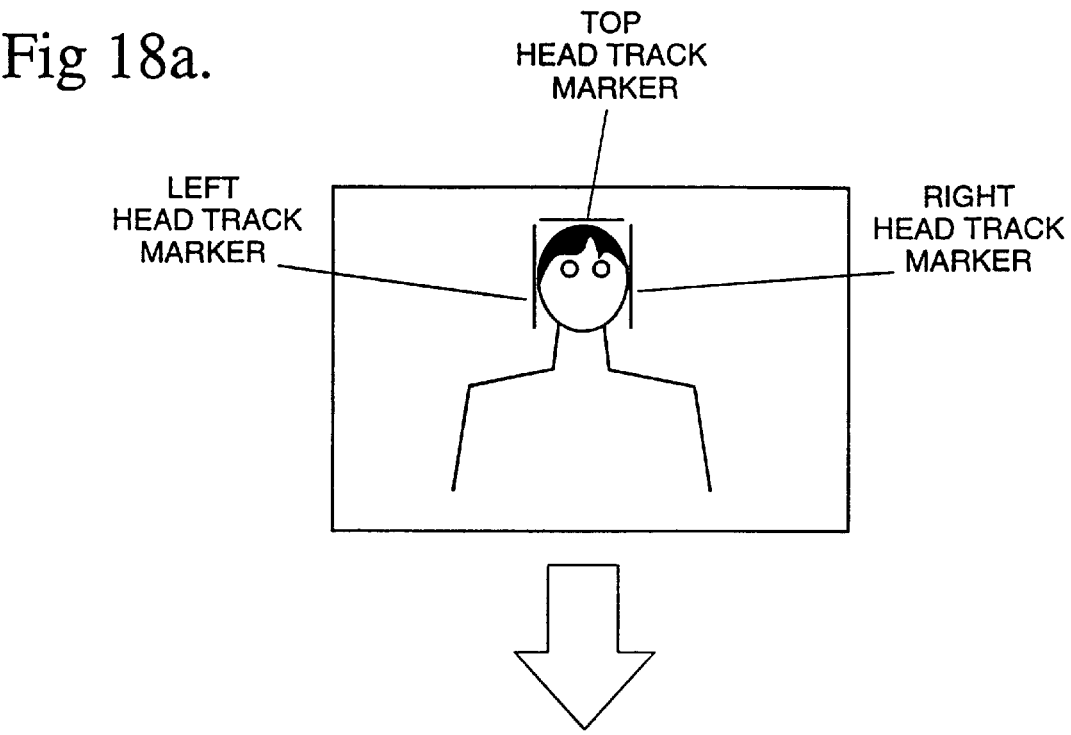
Figure 18B:
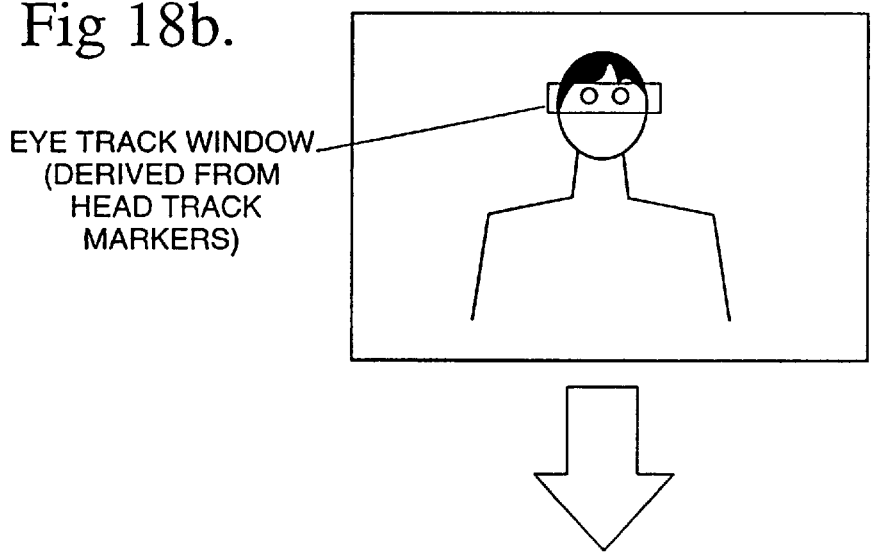
Figure 18C:
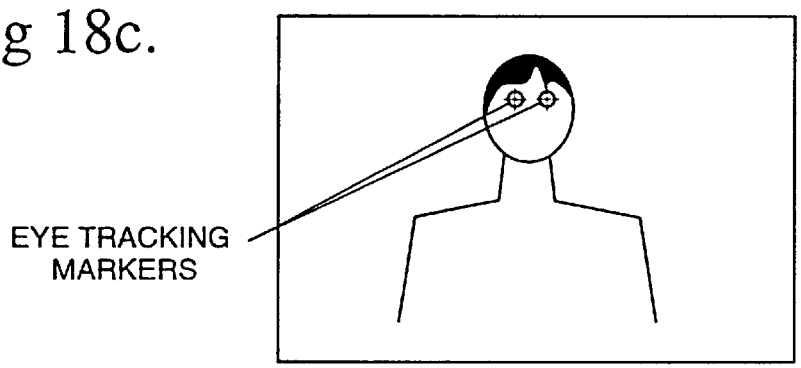
Figure 19A:
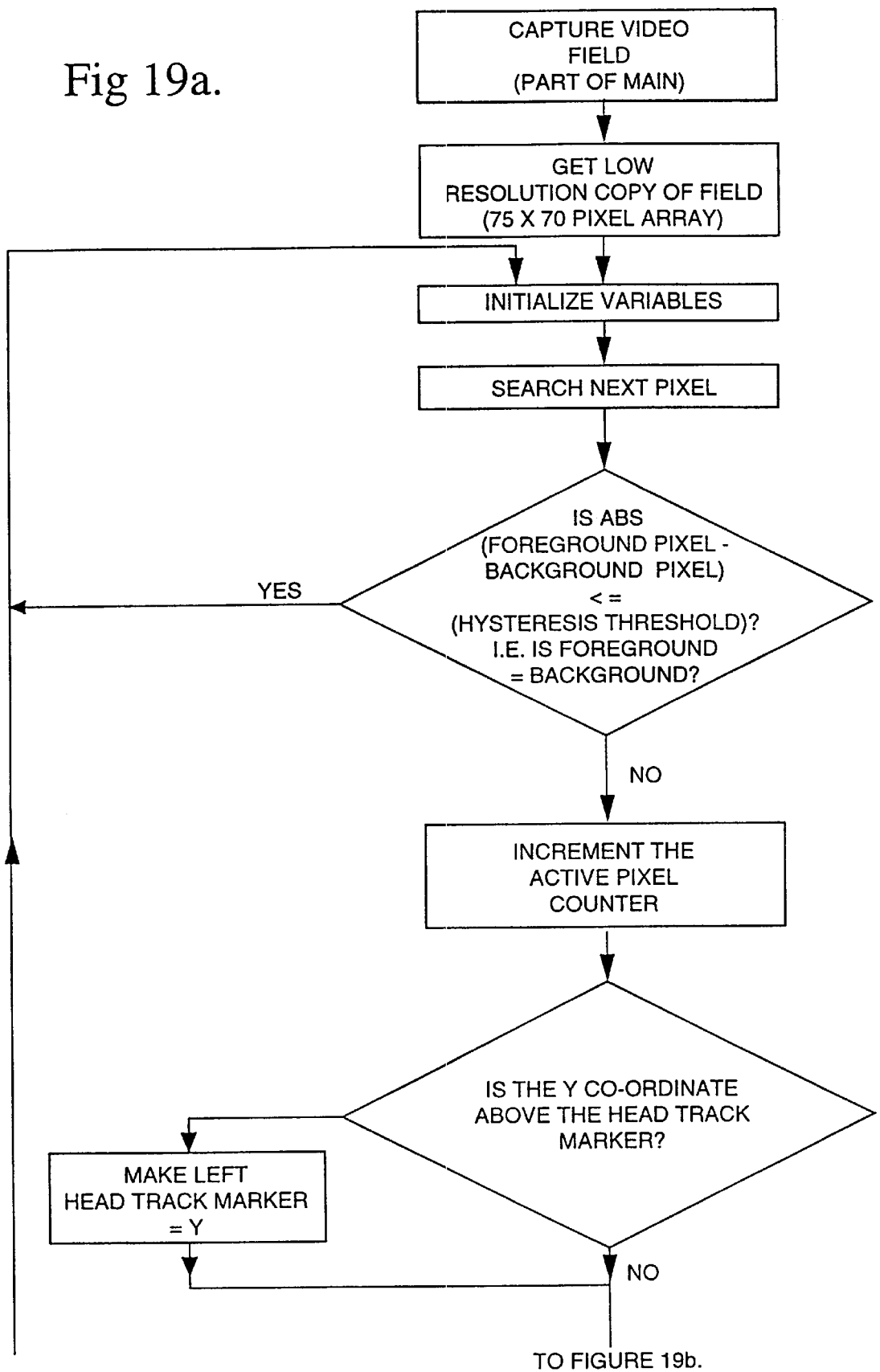
Figure 19B:
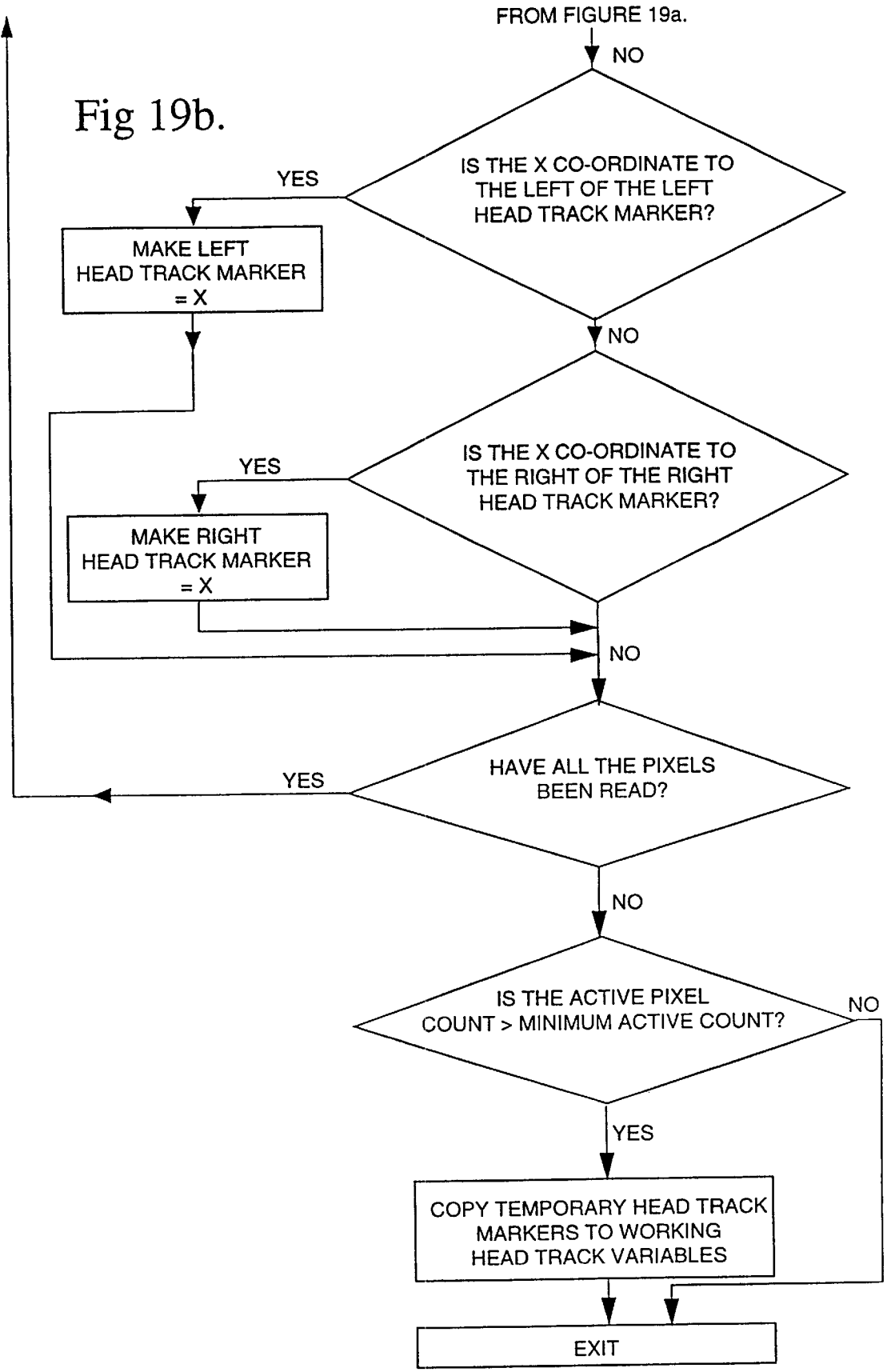
Figure 20:
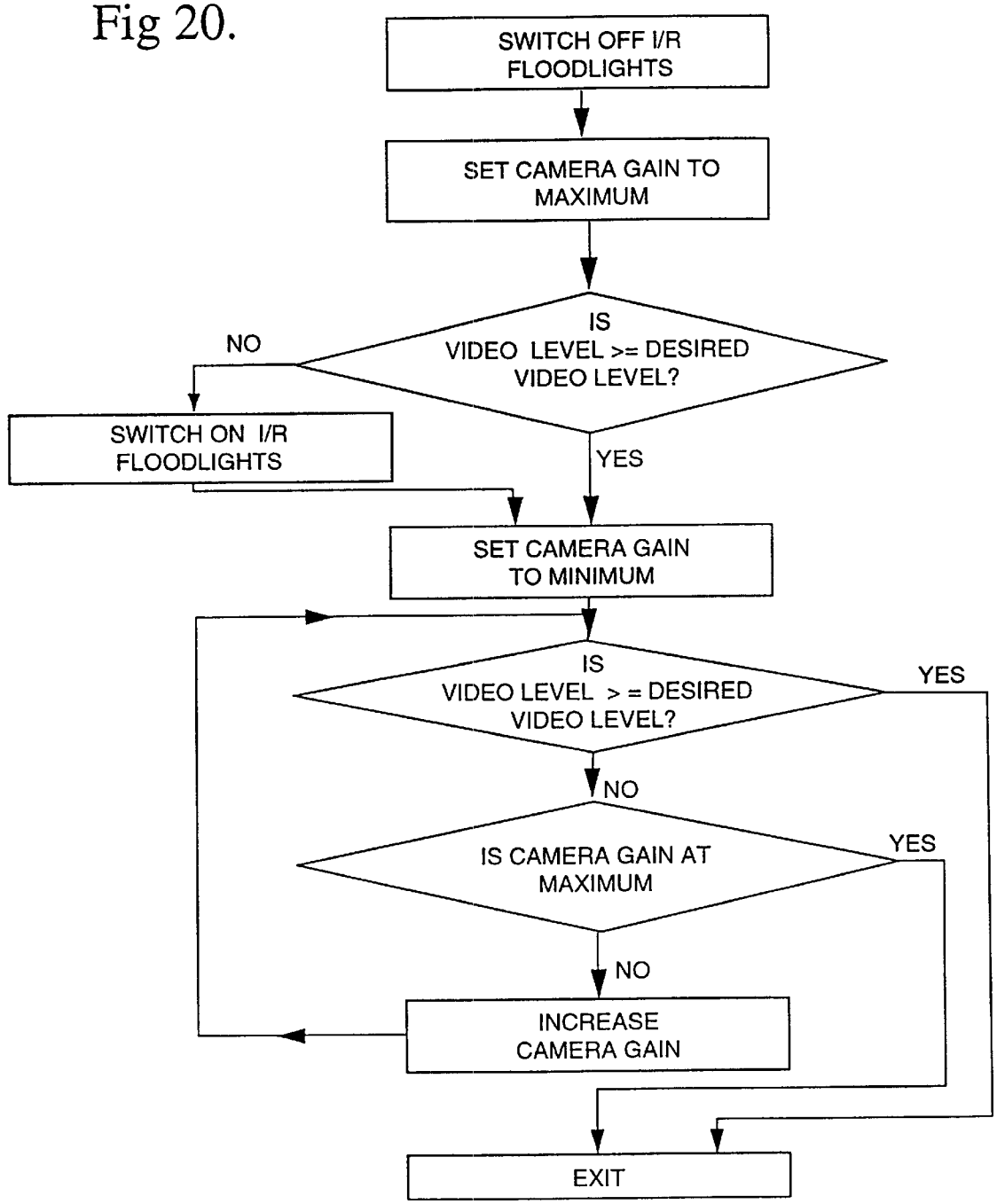

FIGS. 11 (a) and (b) are schematic views showing eye retroreflectivity;

FIG. 12 a first arrangement of a tracking system using a laser scanning technique according to the present invention;

FIG. 13 is a second arrangement of a tracking system using a laser scanning technique according to the present invention;

FIG. 14 is a third arrangement of a tracking systems using a laser scanning technique according to the present invention;

FIG. 15 is a fourth arrangement of a tracking system using a laser scanning technique according to the present invention;

FIG. 16 is a fifth arrangement of a tracking system using a laser scanning technique according to the present invention;

FIG. 17 is a sixth arrangement of a tracking system using a laser scanning technique according to the present invention;

FIG. 18 is a schematic view showing the stages of an image analysis technique according to the present invention;

FIGS. 19 to 23 are flow charts showing the various steps of the image analysis technique according to the present invention; and FIGS. 24 to 26 are schematic views illustrating the principle of operation of multi image auto-stereoscopic displays.

There are two main approaches to viewer tracking. These are:

1) tracking of the viewer's head
2) tracking of the viewer's eyes.

Approach two is the most desirable because it is the position of the viewer's eyes that is the desired parameter and not that of the viewer's head. However, it is considerably easier to find the position of the viewer's head and then "predict" the position of the viewers eyes from this information.

Because of many variants, systems that operate on the head-tracking principle will probably operate most effectively by "user-trimming" the system for each specific viewer, i.e., the system then predicts the viewer's eye positions as an offset from the outline of the viewer's head.

There are several different techniques that can be utilised to achieve head-tracking. These include image-analysis based techniques, acoustic echo-range finding or holography techniques and shadow-screen techniques.

Figure 1A:
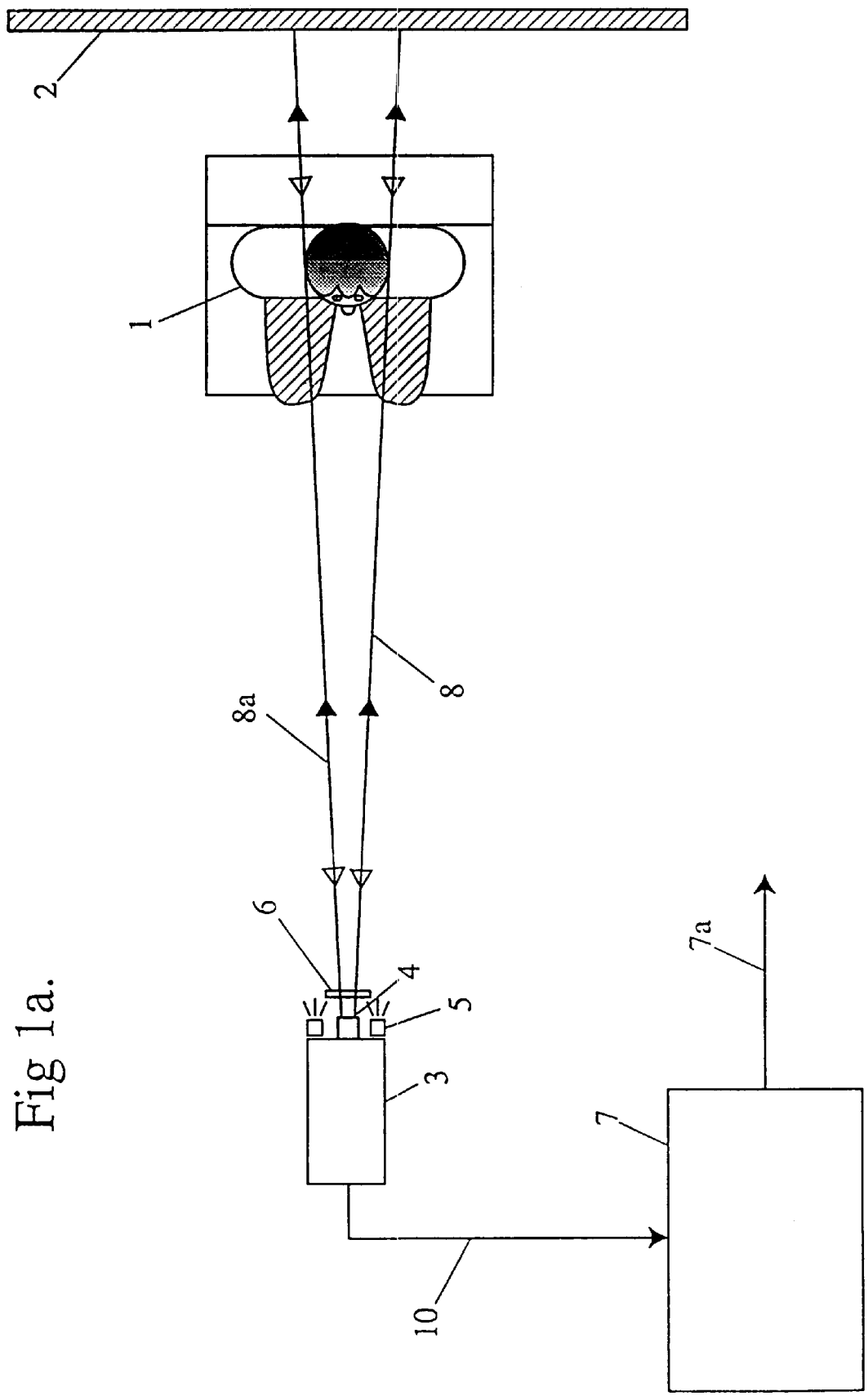

Image analysis techniques can be made to work very effectively if used in a controlled environment, i.e. one which has a known background or consistent and controlled ambient lighting. One of the most effective situations (as shown in FIG. 1(a)) is one in which there is a retroreflective background screen 2 and there is a source of infra-red illumination such as an array of infra-red LEDs 5 located near the optical axis of the camera. In this arrangement, the viewer 1 is located in front of the screen 2. The camera 3 has a lens 4, the optical axis of which is directed towards the viewer 1. The infra-red LEDs 5 are located about the lenses 4 and emit light 8 in a direction towards the screen 2 and viewer 1. In this case there is no great need for complex light level control of a camera 3, which may be a CCD camera 3. The aperture can simply be adjusted so that the exposed areas of the retroreflective screen 2 appear 100% white (saturation). The viewer 1 will then appear as a dark silhouette against the white background. It is then a reasonably simple task to locate the top and sides of the viewer's head through a simple thresholding process in software provided within a microprocessor 7 to determine the head co-ordinates 7a.

A variant on this arrangement which works well in a controlled environment which is free from incandescent lighting. ie. Shown in FIG. 1(b). This configuration consists of CCD camera 3 fitted with an infra-red pass filter 6 and an array of infra-red LEDs or other infra-red light source 5 located near the camera 3 and facing the viewer 1. In this case the characteristic of interest is the high degree of reflectivity of the infra-red light from the viewer's face in comparison to that from the surroundings. It has been found in experiments that even a matt white background located at twice the viewer-camera distance afforded sufficient contrast for the subject's face to be easily discriminated from the background. The main difference between the images generated using this approach over that of the retroreflective screen is that in this case the image of the viewer's face will appear bright against a dark background.

In both of the above approaches, given a sufficient contrast ratio, it should be possible to extract the necessary information from the video signal utilising a much simplified and less expensive circuit than the digital frame store/ microcomputer combination which is usually required for more conventional image analysis based approaches. Such a circuit, as shown in FIG. 2, could for instance work on the principle of a sync separator 9 to extract horizontal and vertical sync pulses 9a and 9b. These pulses could then be read by a high speed microprocessor or micro-controller 7 in conjunction with the input video signal after having been passed through an analogue to digital converter or thresholding circuit. This information should then be sufficient to generate the top, left and right head-position markers without the need for storage of several fields of video information.

A second approach is to use acoustic range finding from several different locations on the display unit and utilising triangulation to find the position of the viewer's head. A system based upon four ultrasonic transducers, one on each corner of the 3D display, would operate as follows. One transducer is used to transmit a pulse, the other three transducers are set to receive the echoes from this pulse. The first pulse that is received (from the closest object) should be from the viewer's nose. By knowing the time delay between the sending of the pulse and when it was received by each sensor, the distance to the object (from each sensor) can be determined and a triangulation method used to locate this point in space.

This procedure is then repeated by emitting a pulse from each sensor in turn and then maintaining a running average to improve the accuracy of the system. More complex algorithms and different numbers and configurations of transducers could be used to determine multiple points rather than only detecting the closest point.

Alternatively, acoustic Holography techniques may be used to determine the position of the viewer's head. With sufficient resolution this technology could be used to determine the location of the viewers eyes.

The shadow screen techniques appear to be one of the simplest and most cost effective of the many techniques available. The shadow screen can be configured in several ways as shown in FIGS. 3a and 3b.

With the configuration shown in FIG. 3a, a single light source 16 (which may consist of an array of infra-red LEDs) would flood the viewer 1 with a source of coded or direct light 16a. An array of photodetectors 15 behind the viewer 1 would then decode the received light into either a "block" or "pass" situation.

By virtue of this approach a silhouette or "shadow" of the person can be formed and the position of their eyes estimated from given norms or custom programmed for an individual viewer.

Coded light (ie. modulated) would probably be used in preference to simply direct (static) illumination because it allows better discrimination against ambient lighting and stray reflections that may occur (causing light to follow paths other than a direct line-of-sight between the viewer and the screen).

An alternative configuration of the system is shown in FIG. 3b. In this implementation the screen 17 is composed of light sources 17a and a single detector 18 is employed. This configuration is probably less expensive than that shown in FIG. 3a because it requires only a single optical detector and amplifier section (which are generally more expensive than infra-red LEDs). In this case the light sources could be modulated using either time multiplexing, frequency modulation or other appropriate modulation/coding techniques to allow the detector to discriminate one light source from another and thus to make possible a determination of which light source is being blocked by the viewer.

Figure 4A:
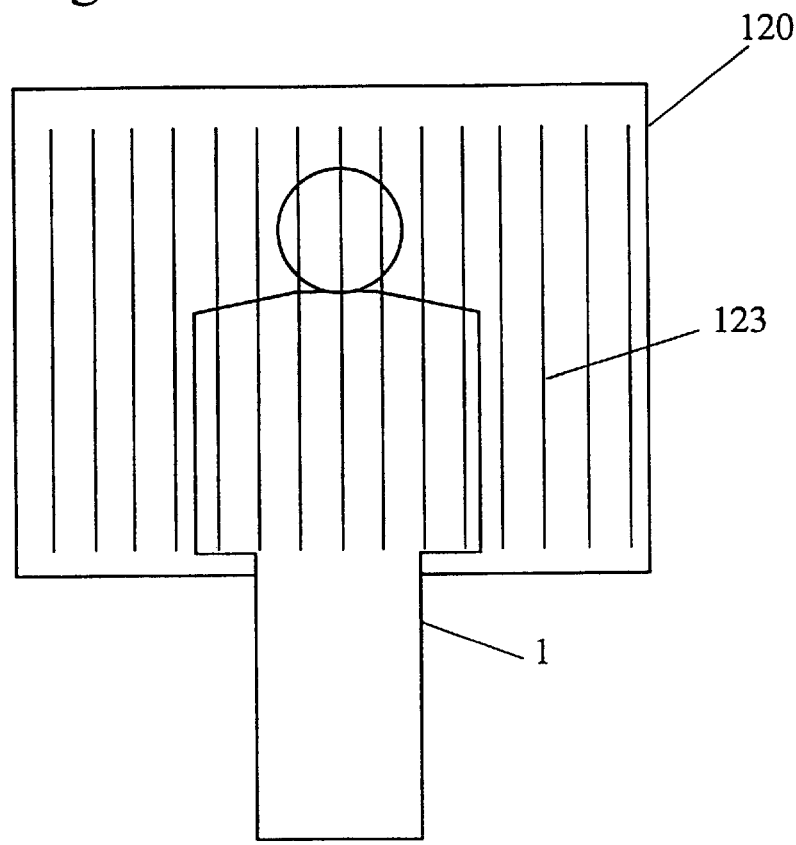
FIG. 4 is a schematic view of an arrangement of a tracking system using vertical stripe techniques according to the present invention.
Figure 4B:
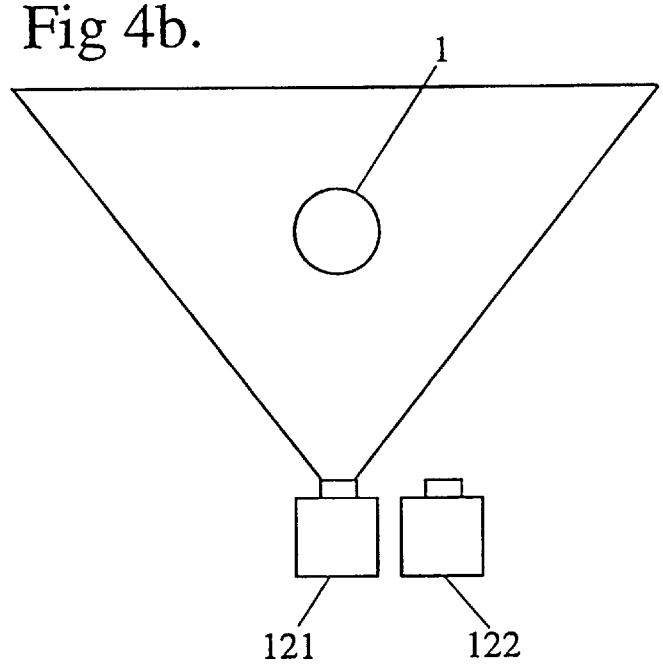

An alternative configuration of the system is shown in FIG. 4. In this implementation a series of vertical stripes of infra-red light 123 is projected at the viewer 1 and screen by an infra-red light source 121. An infra-red detector 122 receives reflections of the lines from the scene and by suitably time coding and modulating the stripes of infra-red light it is possible to determine the position of the viewers head.

Figure 1B:
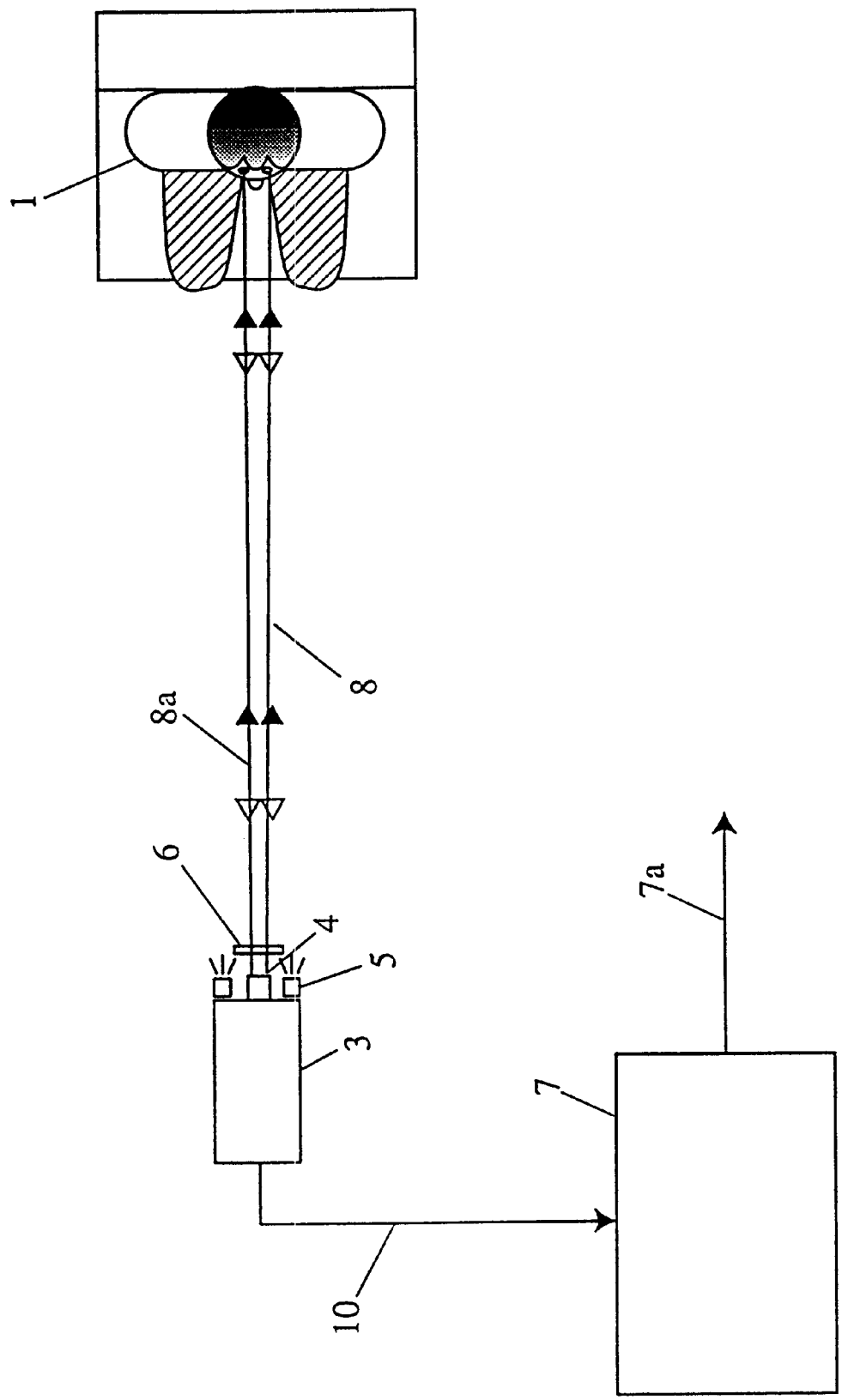

As in FIG. 1(b) it is possible to eliminate the retroreflective backdrop 120 and rely purely on facial reflections from the viewer.

Alternatively the system may be used without a reflective screen whereby the reflected infra-red stripes from the viewers face may be monitored with a video camera which may view the distortions in the vertical stripes and can determine depth information. These depth contours are then used to determine the position of the head.

If the vertical stripes are too close together, then there is a possibility of an aliasing effect if a band is distorted (due to a difference in depth) by more than half the distance between the stripes. To avoid this and still maintain an adequate resolution it will be necessary to have the stripes coarsely (but evenly) spaced and then shift the relative position of the first stripe over successive frames. One side effect of this approach is a reduction in the sampling rate. Another potential problem is that the system may be prone to detecting highlights such as reflections or other bright light sources as if they were vertical stripes. This problem can be overcome by using a differential analysis technique.

Although inexpensive and reliable the fundamental problem with headtracking techniques for the enhancement of 3D display systems is that the desired information (ie. the position of the viewer's eyes) is simply being estimated and, as the system has no way of taking into account rotation of the viewer's head, it is possible (particularly when the viewing angle is high) for the left eye to move into the right eye position and vice versa simply by the viewer rotating their head slightly, as would be expected during normal viewing.

As this situation constitutes a *100%* failure in 3D perception it indicates the need for a more direct approach.

Eye tracking overcomes the problems of estimation encountered with head tracking by following the position of the viewer's eyes directly. This can be achieved by a number of means but of the different approaches the two most practical are:

1) retroreflectivity
2) image analysis

Eye tracking systems based on retroreflectivity are arguably the most rugged and reliable as they are less affected by ambient light level changes and are immune to shadows and other similar optical distractions.

Figure 5:
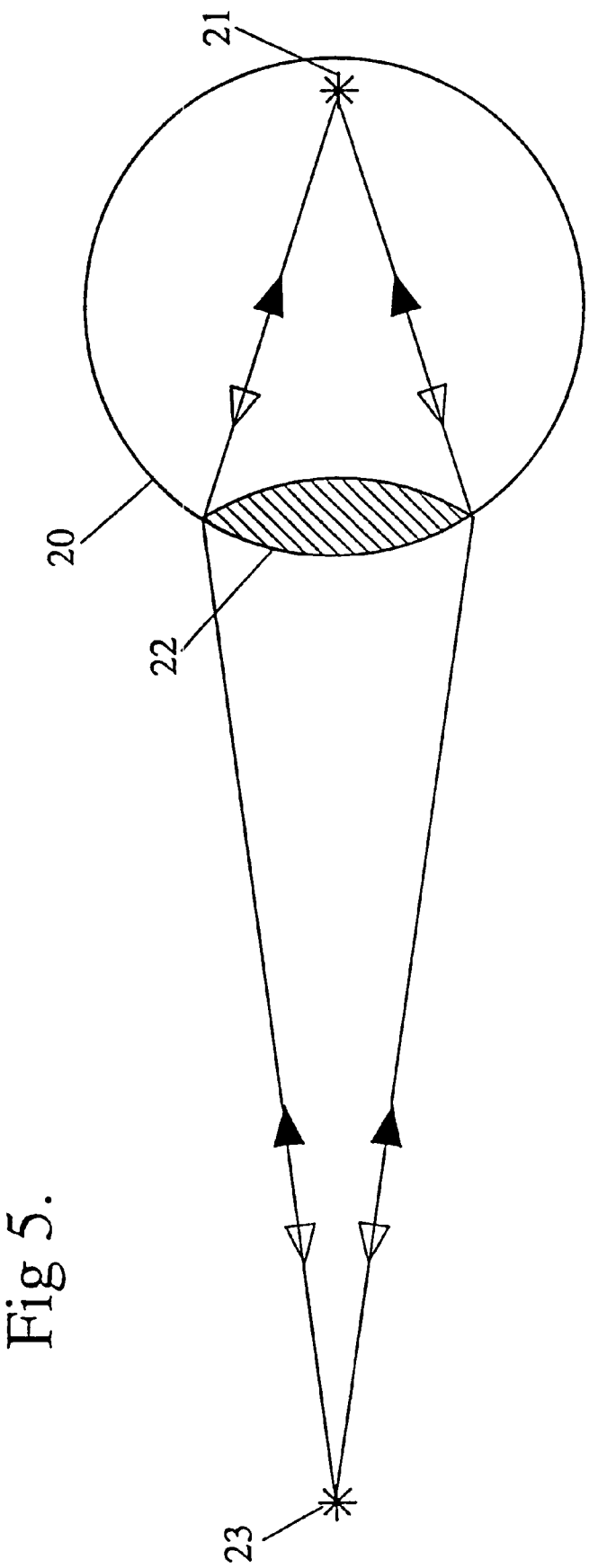
FIG. 5 is a schematic view of a human eye showing the lens and retina.
Figure 6A:
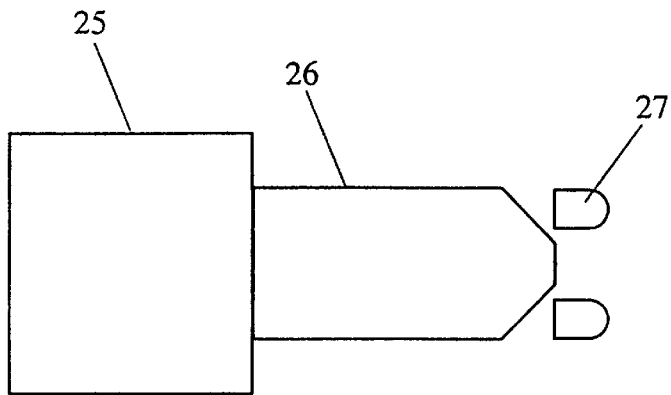
FIG. 6 is a first arrangement of a tracking system using a single camera according to the present invention.
Figure 6B:
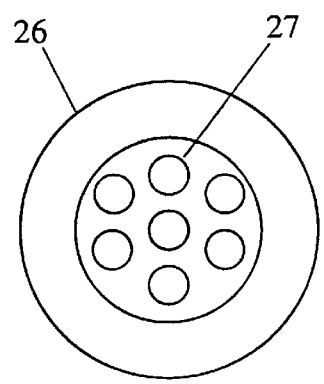

The retroreflective eye tracking systems are based on primarily on the "cat's eye" principle i.e. as shown in FIG. 5 the characteristic of the eye 20 to reflect light back to its origin. This is due to the arrangement of the lens 22 and retina 21. The degree to which the retroreflectivity effect occurs is influenced by the intensity of the incident light, the area of the pupil and therefore the amount of diffuse reflection from the retina 21. This amount of reflection, and thus the effectiveness of the "cat's eye" effect is much greater in animals (such as cats and dogs) than in humans because of different eye physiology. In theory it should be possible to achieve a functional system with a simple configuration such as shown in FIG. 6 which can be designed to detect the brightest points of the image which should be the viewers eyes. However, even with the light source very close to the optical axis of the camera the degree of retroreflectivity was not sufficiently higher than that of ordinary diffuse reflection off the cheeks and nose of the viewer to afford a high degree of reliability. In addition to this problem, other light sources and highlights from reflective objects such as glasses will appear to be as bright as the retroreflective points in the viewers eyes. For these and other reasons a more sophisticated approach had to be taken.

The configuration shown in FIG. 6 consists of a video camera 25 coupled to a pin hole lens 26. Surrounding the pin hole lens 26 is an array of infra-red LEDs 27. This configuration has been chosen so that the LED light sources 27 are as close to the optical axis of the camera lens 26 as possible in order to maximize the retroreflectivity effect from the viewer's eyes. The camera is positioned such that the light from the infra-red LEDs illuminates the viewers face and eyes. Thus the video output from the camera 25 contains this image.

Under conditions where there is low ambient lighting and no reflections from the viewers glasses or other objects it is found that the level of retroreflectivity is more than sufficient for simple threshold techniques to be employed. However, under conditions where there are high levels of ambient light, or reflections from the viewer's glasses or other objects, then the ratio of retroreflectivity to facial or extraneous reflections drops below that which is analysable with simple decoding processes.

In such situations it is necessary to employ differential analysis techniques to remove unwanted reflections, the background, and other spurious lighting conditions.

The simplest differential analysis technique that can be employed is to capture one field with the infra-red LED light source switched on and then a second field with the light source switched off. These two images can then be subtracted in the computer and the difference further analysed.

Figure 7A:
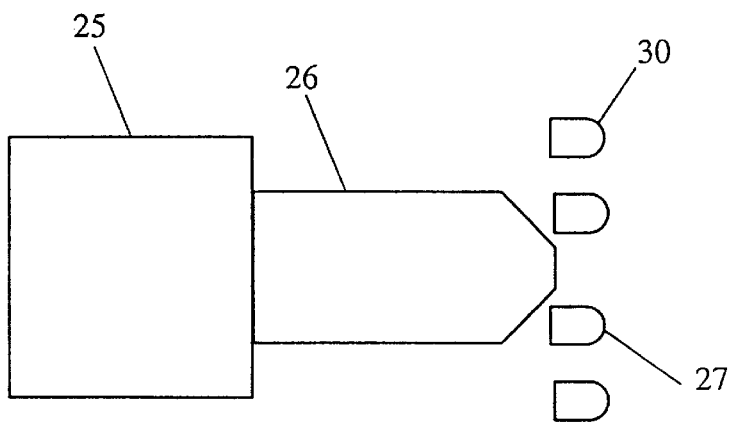
FIG. 7 is a second arrangement of a tracking system using a single camera according to the present invention.
Figure 7B:
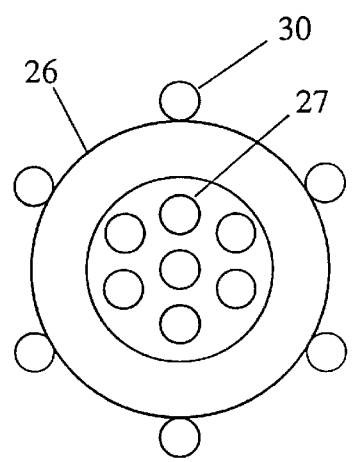

The problem with this approach is that the average light level from diffuse reflection from the viewer's face will change as the infra-red LED array is switched on and off. A more workable configuration is shown in FIG. 7 in which there are two arrays of LEDs 27 and 30 such that only one set is switched on at any time. Both arrays are circular and are concentric around the optical axis of the camera lens 26. Thus when array 27 is lit the camera 25 will receive a combination of direct reflection (from shiny surfaces) diffuse reflection (from matt surfaces) and retroreflection (from the viewer's eyes). When array 30 is lit the Camera will receive only direct reflection and matt reflection. Thus by subtracting the two images it is possible to extract the RETROREFLECTION from the other forms of reflection.

A problem with this approach is that as the images can only be captured at field rates (ie.20 ms/field for PAL video format) there is a significant level of temporal displacement between the images and thus if there is any significant movement by either the viewer or the cameras then subtraction of the two images will result in incomplete cancellation of unwanted reflections. This problem can be overcome by capture of both images simultaneously. There are several optical configurations that make it possible as shown in FIGS. 8 and 9.

Figure 8A:
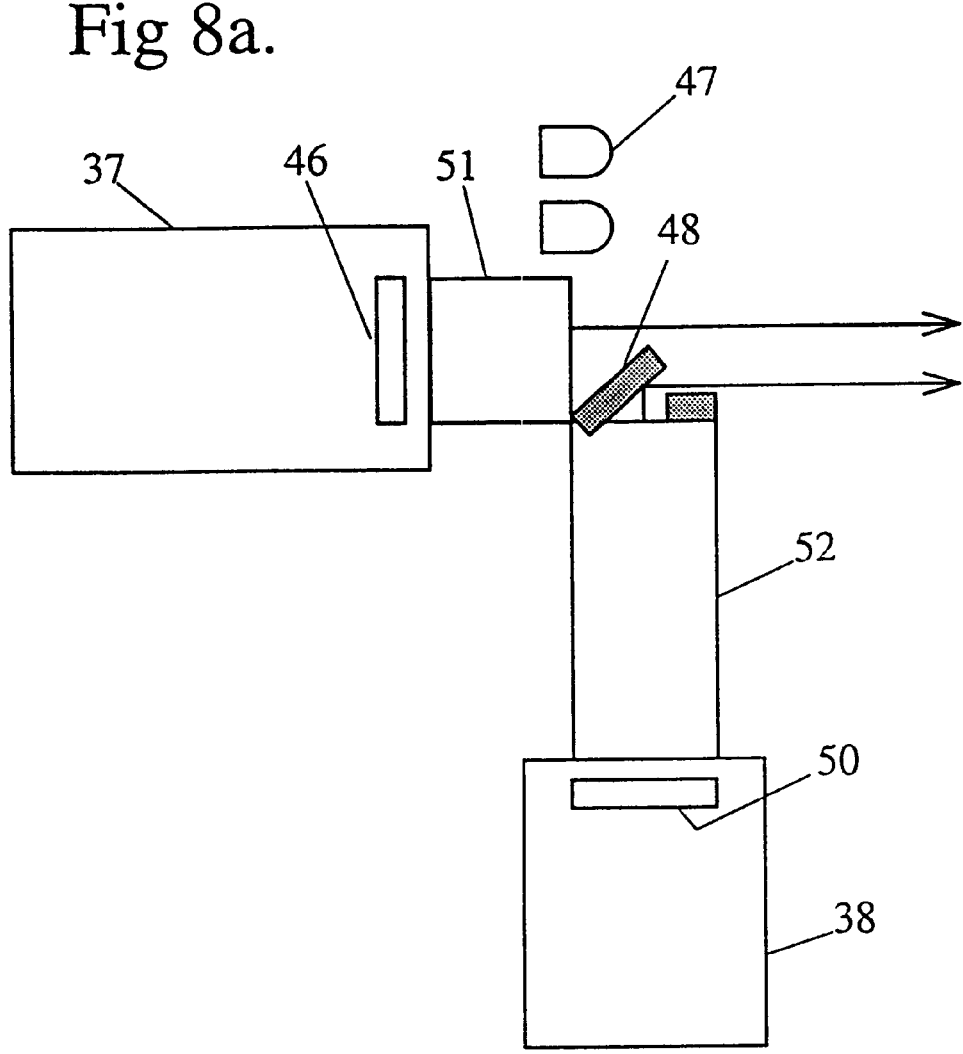
FIG. 8 is a first arrangement of a tracking system using a dual camera system according to the present invention.
Figure 8B:
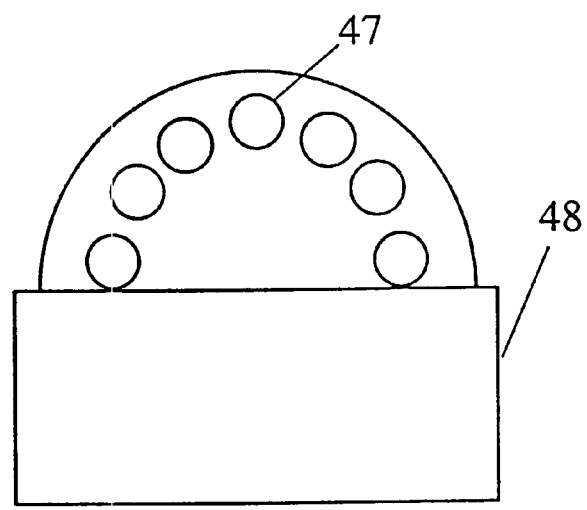

FIG. 8 consists of a pair of cameras 37, 38 in which a front surface mirror 48 splits the image from each lens in half. One of the cameras is fitted with a semi circle of infra-red LEDs 47 close to the optical axis of the camera such as shown for camera 37. This basic configuration operates as follows: Camera 37 will receive retroreflection in addition to matt and direct reflection whereas camera 38 will receive only matt and direct reflection. Because Camera 38 is not illuminated along its optical axis it does not receive retroreflections. However unlike the previous example the two images have been captured concurrently and thus are not effected by viewer or camera movement. In this case the video information from both cameras is captured by a digital frame store and analysed by a computer utilising similar techniques as previously described.

Figure 9:
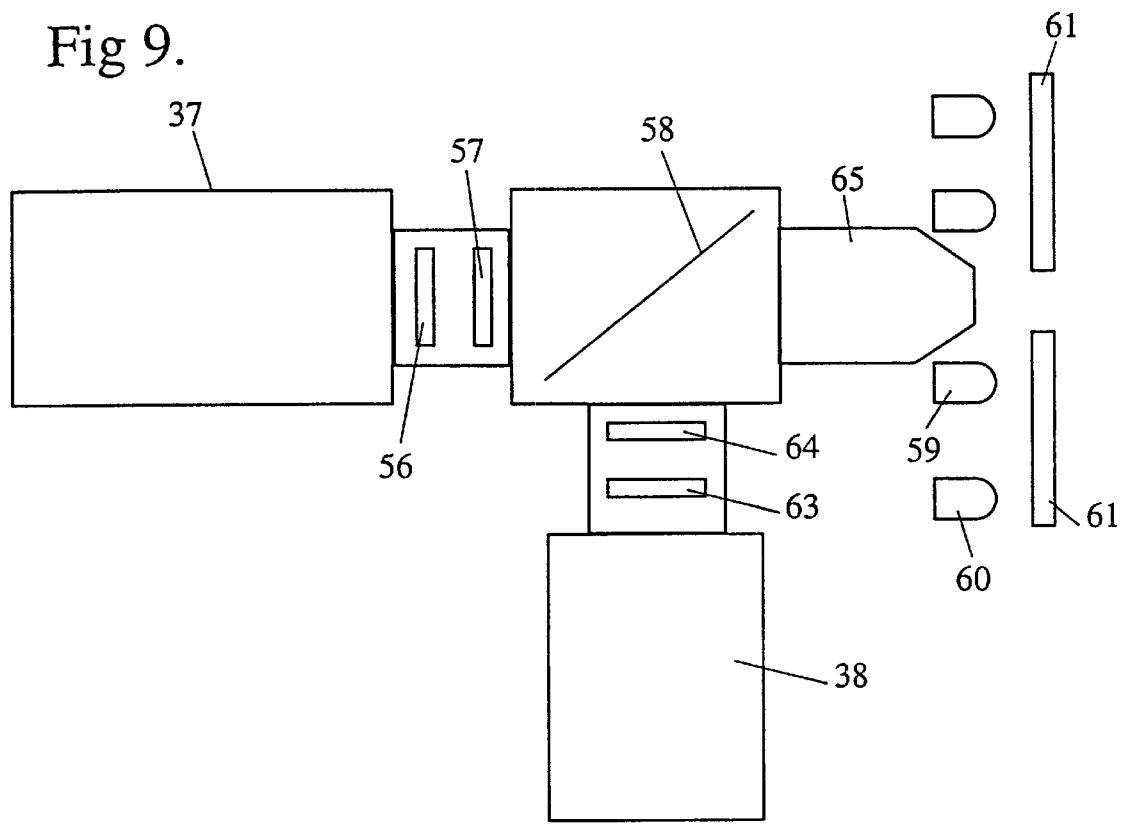
FIG. 9 is a second arrangement of a tracking system using a dual camera system according to the present invention.

A similar function can be achieved by the configuration as shown in FIG. 9. In this case retroreflections and non-retroreflections are separated through the use of narrow band pass interference filter 57, 64 and infra-red LED light sources 59, 60 of slightly differing wavelengths. This configuration is superior to that of FIG. 8 in that the optical paths are identical which improve the effectiveness of the image subtraction process. However, it should be noted that the use of differing wavelengths of light may cause some variation in image brightness due to colouration of facial tissue etc.

One of the major problems that have plagued all of the aforementioned retroreflective eye tracking systems is that of direct reflection of the light source (usually off glasses or the metallic frames of glasses worn by the viewer).

Figure 10:
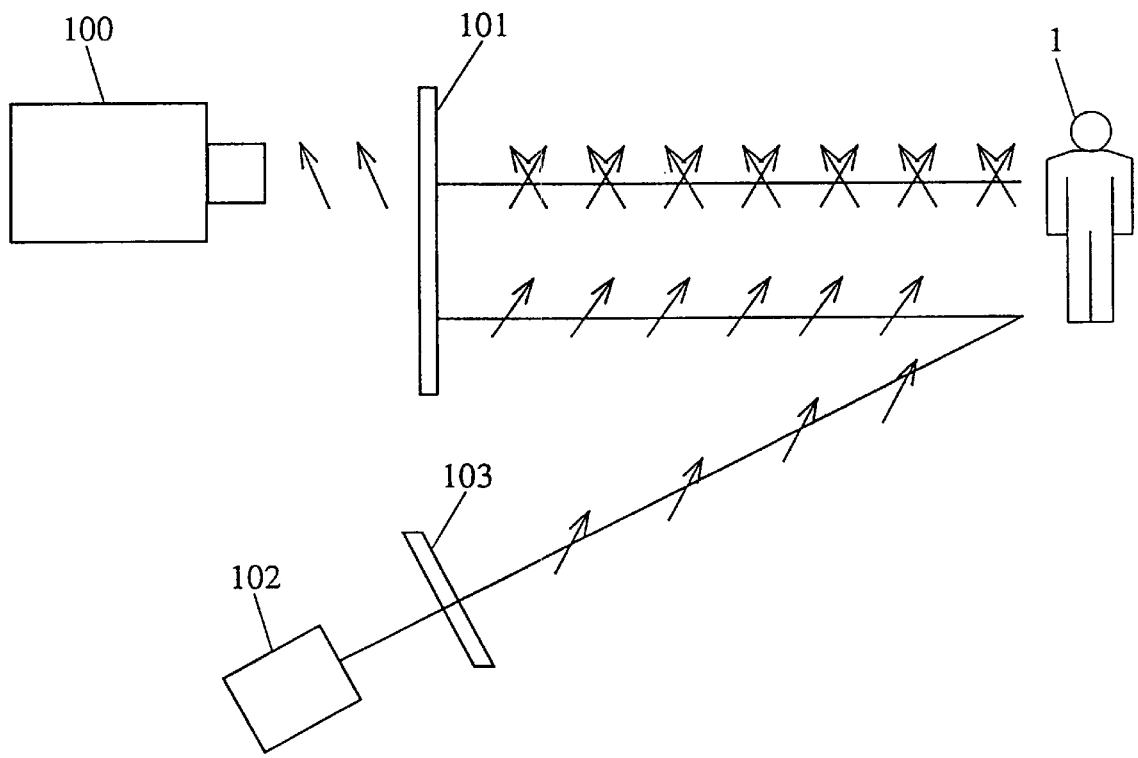
FIG. 10 is an arrangement of a tracking system using polarisers according to the present invention.

Although these false highlight points can be significantly eliminated in the subtractive processes employed in FIGS. 7 and 9 (due to the double concentric sets of infra-red LEDs) this point-cancellation often eliminates the retroreflection from the viewer's eyes as a side effect (due to the cancellation of corneal reflections which are virtually touching the pupil highlights present in retroreflection). This problem can be significantly overcome in all of the aforementioned configurations through the use of cross aligned polarisers as shown in FIG. 10. It has been found that direct reflections tend to retain the angle of polarisation on the incident light whereas matt reflections and retroreflection (from the retina) tends to cause depolarisation of the incident light. Thus if the transmitted light is polarised in one plane and the camera (or cameras) are fitted with polarisers which are cross polarised to this plane then direct reflections will be blocked but matt reflections and retroreflection will be accepted by the camera.

This method of adding polarisers to the light source and detector can be added to any of the above techniques. Thus utilising these techniques it is possible to achieve a retroreflective eye tracking system that can extract a retroreflective signal well below the optical noise level and also be immune to viewer and camera movement.

However this brings us to a new problem which we describe as the pupil contraction phenomenon. To explain this phenomenon we must first explain the mechanism by which retroreflection from the eye occurs.

From the above it can be seen that the usage of retroreflectivity techniques can be effective in determining the position of the eyes but these techniques may be problematic depending on the application. A major problem that has not been covered in the above discussion is the physiological influence of the eye on its retroreflectivity.

In normal eye operation any bright light incident on the eye will cause pupil contraction. In auto-stereoscopic displays the bright light may be from the bright images that are projected to each eye or from bright ambient lighting. As the light intensity increases the pupil contracts and the eye's retroreflectivity becomes significantly less detectable.

Figure 11A:
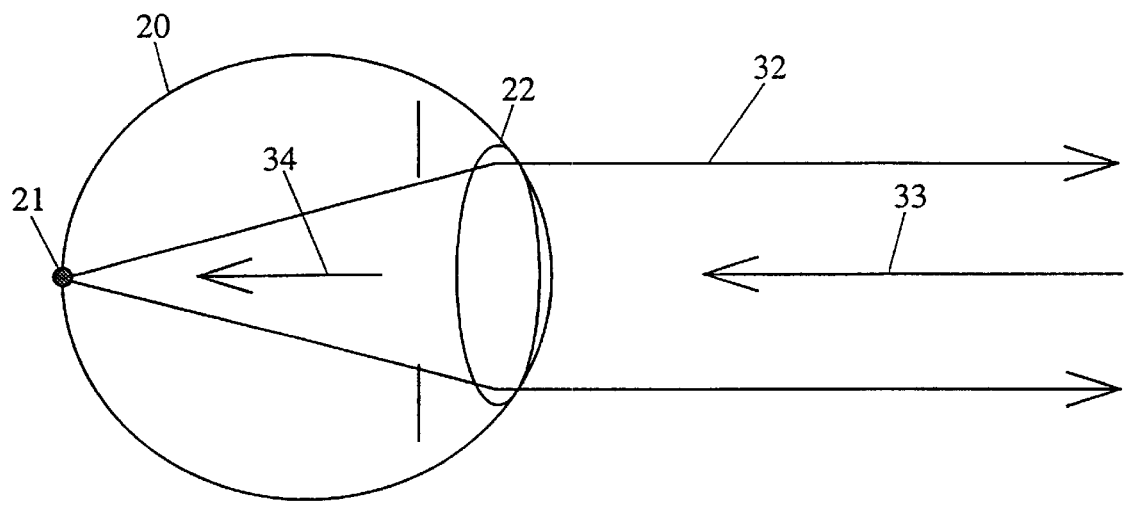
Figure 11B:
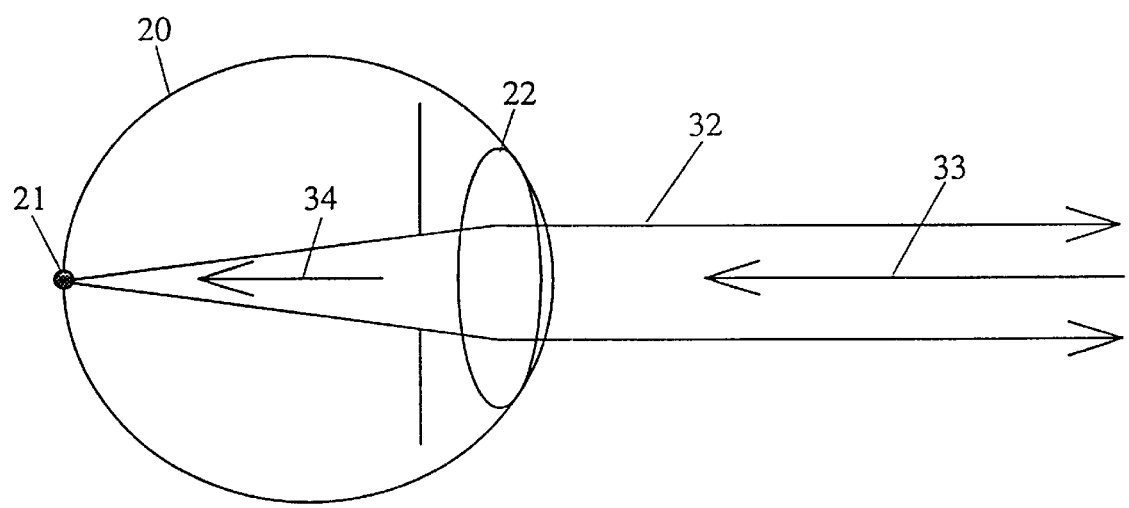

The mechanism by which pupil contraction affects the retroreflectivity index of the human eye is shown in FIGS. 11(a) and (b). As can be seen in FIG. 11(a) with the pupil expanded, a large portion of the incident light 33 is allowed into the eye 20. This light is then focused by the lens 22 to a point at the retina 21. The diffuse reflection from the retina 21 is then re-focused by the lens 22 into a parallel beam of light with intensity 32. In the case of pupil contraction as shown in FIG. 11(b) much less of the incident light 33 is allowed into the eye to form the effective incident light 34 thus the intensity of the light returning to the lens from the focused spot is significantly reduced. Because of this the intensity of the returned light 32 is much lower than in the previous case (ie. FIG. 11(a)) in addition to having a smaller return beam diameter.

All of the infra-red LED based eye-tracking systems described earlier suffer from the pupil contraction phenomenon which renders them unreliable in conditions of high ambient light. However referring back to the previous example of the retroreflection from the eye, if it were possible to guarantee that the same intensity of light entered the eye (34) under all conditions then pupil contraction would not affect the intensity of the return beam (32) but only the diameter of the return beam. In this case the same retroreflectivity index would exist regardless of pupil size.

If instead of using a diffuse Infra-red LED based light pattern, this system utilised a light source based around a scanned laser beam, and provided the laser beam used is smaller in diameter than the pupil diameter of the viewers eyes, then such a situation would exist. In its most simplistic configuration such a system could be realised as shown in FIG. 12 which illustrates a laser transceiver module 105, a rotating mirror assembly 75 and a rotating or oscillating mirror assembly 80.

By suitably synchronising the array of rotating mirrors 75 and moveable mirror 80 the light beam can be caused to repeatedly scan across the viewers face in a manner similar to a 'Flying Spot Scanner' as used in television technology. Alternative techniques may be used to cause the light beam to scan across the viewers face such as a mirror or mirrors mounted upon a voice coil assembly or utilising micro mirror technology (as manufactured by Texas Instruments, USA).

Laser assembly 105 consists of a modulated laser 107 and one or more optical detectors 106. The best performance can be achieved if the detectors are collimated through the use of lenses and are slightly displaced from the beam axis so that direct reflections from dust particles on the mirrors etc do not cause the outgoing laser beam to be incorrectly detected as a return beam.

Benefits can be derived through modulating the laser light source to eliminate the effects of ambient light. However due to the serial (point by point) nature of the image detector (probably PIN or avalanche diode) it is now possible to modulate the light source on either a pixel by pixel (point by point) or line by line basis thus overcoming any sensitivity of the system to either viewer or scanning system movement. As the pupil diameter of the viewer may be quite small (perhaps 2 mm) then it is considered better to modulate the beam on a pixel by pixel basis rather than using line based modulation as missing alternate scan lines may cause the pupil to be missed or ignored. It is recommended that a sine wave or triangular modulation of the laser beam be used as this will then allow conventional synchronous demodulation techniques to be employed effectively at the image decoding phase.

As in the previous LED based systems, direct reflections can be eliminated through the use of cross polarised filters placed in front of the detectors. The only difference between the laser systems being that many of the semiconductor laser modules already produce a plane polarised beam and thus there will be virtually no reduction in overall sensitivity of the system through its incorporation.

A problem with the configuration shown in FIG. 12 is that by virtue of the displacement between the optical axis of the laser 107 and detector modules 106 it will require that the primary beam deflector 75 be quite large. Alternate configurations for the system shown in FIGS. 13,14 and 15 overcome this problem by moving the detector optics 78,79 out of the optical path of the primary beam deflector thus allowing a significant reduction in the overall system dimensions.

In these examples the single element detector has been replaced by a line based detector assembly 85, such as a linear CCD array, which would be read out after each scan of the laser beam. It is also possible to use a conventional full field type scanning device such as a conventional CCD camera 110 through the use of a slightly different optical arrangement as shown in FIG. 16. In this configuration the scanning system would scan in two axes utilising a single mirror arrangement 112 such as a two axis voice coil drive or other deflection system.

A practical implementation of this point divergence system is shown in FIG. 17. In this case the optical arrangement consists of a two axis prismatic scanning system followed by a projection lens. The return light from the subject is detected by a conventional CCD video camera 127 fitted with a pinhole lens 128. One of the main advantages of this system over the previous systems is the simplicity of the detection system and the fact that the optical axis of the detector can be brought very close to the optical axis of the outgoing beam without any risk of cross talk between the outgoing beam and the detector return beam. This is possible due to the absence of mirrors and or other optical elements in the combined optical path.

The system operates as follows. As in the previous systems a laser 120 (fitted with a polariser 121) is used to produce a collimated beam of light which in this case is incident upon a pair of rotating square or multisided prisms 124, 125. The prisms are orientated such that their rotational axis are at 90 degrees to each other. Due to the property of refraction, the prisms cause the laser beam to scan a rectangular area such that the emerging beam is always parallel to the beam incident to the prisms. This parallel scanned beam is then run through projection optics as shown. These optics translate the horizontal and vertical displacement into angular displacements (from the optical axis of the lens).

By virtue of the optical characteristics of the lens the resulting scanned beam will converge to a focus point in front of the detection lens 128. At this point the beam diameter will be in the order of only several millimeters and thus it becomes possible to place the lens 128 of the detection camera 127 very close to the optical axis of the projection system. This was not possible with any of the previous scanning systems because of the presence of two different points of beam convergence for the horizontal and vertical planes. This closeness to the optical axis of the laser beam greatly improves the ratio between retroreflection and normal diffuse reflection (retroreflection index) and thus improves the system effectiveness.

An improvement to the laser techniques can be achieved if the light source is amplitude modulated with a sine wave of known frequency. Since only reflected light from the modulated light beam will be modulated with this known frequency, conventional coherent demodulation techniques can be used to detect the signals representing the retroreflections from the retina at the output of the light detector.

Any of the combinations of the above scanning and detection techniques may be used in the invention to determine the eye position depending on the application.

These tracking systems can be used singularly or in pairs to provide enhanced operation, with the following advantages:

1) Extra discrimination of false bright points through the use of depth information.

2) Provide spatial data about the distance of the viewer from the display.

3) Elimination of positional errors due to incorrect viewer distance—this can be overcome by simply averaging the spatial co-ordinates of the two images.

4) To provide additional information for focussing the projected images to the viewer's eyes.

IMAGE ANALYSIS

Phase A

The image analysis approach is the most sophisticated of all of the eye tracking systems. As with the retroreflective based system it uses a video camera fitted with an infra-red filter. The infra-red spectrum was chosen because of the reduced influence of skin pigmentation on the degree of reflectivity of light. The video camera is connected to a digital frame store and a microprocessor board.

The microprocessor analyses the video information and identifies the position of firstly the viewer's head and then the viewer's eyes. It does this based on a general understanding of the nature and configuration of facial features and is independent of any specific viewer characteristic.

The analysis takes place in two main stages as shown in FIG. 18. Phase A—18(a), (b) and Phase B—18(c). The first stage of analysis is to find the position of the viewer's head. This is important because it allows the search area for the viewer's eyes to be significantly reduced. This has dual advantages of firstly improving the frame rate of the analysis (i.e. speeding up the analysis) and secondly improving the accuracy of the analysis by masking out areas in which erroneous background information is present.

The basic processing steps involved in the determination of position of the viewer's head are shown in FIG. 18. it should be noted that the basic mechanism for the analysis in this stage is that of a subtraction operator. The purpose of this operator is to find differences between the foreground (the image with the viewer present) and the background (the image without the viewer present) thereby removing the image of the viewer from the background. This resulting information cannot be used directly for any further stages of analysis because it has been altered from that of the original foreground image but it can serve to provide the necessary borders for the second stage of the analysis as shown in FIG. 18(b).

As this first stage of analysis is not used for determining actual eye coordinates there is not the demand for a high degree of precision, and as such, analysis is performed to only a relatively low resolution 75* 70 (horizontal * vertical dots). As can be seen in the main body of the analysis, the first step is to read in a field in low resolution (75 * 70). This field is then subtracted from a background array (of the same resolution). This difference information is then compared on a point by point basis against a threshold value of acceptable deviation. If the difference falls outside of this region then the point is considered "hot" i.e. the foreground in this region is different from the background. If the difference falls inside this region then the point is considered "cold".

The "hot" points are then used to determine the top, left and right head markers, "cold" points are ignored, i.e. the highest "hot" point encountered is used to set the topmarker, the left-most "hot" point is used to set the left-most marker and the right-most "hot" point is used to set the right-most marker.

A record is also kept of the total number of "hot" points encountered for each field analysed. This total number of points is compared with a threshold value. For a head position analysis to be considered valid, and the temporary head track markers to be subsequently copied to the working markers there must be at least as many "hot" points as this threshold value. If this situation is not met then the headtrack search will be considered "cold", the eye-track search will not commence and the previous eye-positions will be maintained.

As can be seen from the main-loop of the head-tracking program, it is vital that the system has a reliable image of the background (i.e. without the viewer present) for correct processing to be possible. This is handled by two different sections of the program. The first is the initialise section. This occurs once only during start-up and is outlined in FIG. 20. During initialisation the gain of the camera is altered by the micro-processor board until the average video level is within a specified band. This is necessary to guarantee sufficient contrast within the image to allow correct analysis. It should be noted that it is not possible to simply use the auto-iris or auto-light level on the video camera because when a viewer steps into the view of the video camera the overall light level changes thus causing a variation in camera gain which results in the background being "perceived" as having changed from the grabbed image. If after the camera gain has been increased to maximum the image is still too dark then the microprocessor will switch on a bank of infra-red LEDs to illuminate the viewers face and the camera gain setting procedure will begin again.

Although this simple procedure works satisfactorily, it does not take into account the possibility of slow changes in background light level which would be expected to occur over a period of several hours, particularly due to changes in natural lighting. This situation is handled by the "delta" routine which is part of the main loop of the program. This routine watches for movement within the image between successive fields. Through this analysis it is possible to determine if the viewer is standing in front of the camera (even if they are standing still, slight movements can be detected). This movement detection is used in conjunction with the "eye-lock" validity flag (which will be discussed later) and a timer to allow the system to re-grab the background. For this to occur the following criterion must be met.

1) The valid-eye-lock flag must be clear (i.e. no eye-lock)

2) The delta operator must be indicating that there is no movement

3) Conditions (1) and (2) must have been met for 5 seconds

When all three of these criterion have been met, a check is done on the average light level of the camera, and if sufficiently different from that set during the initialise phase, the camera gain and infra-red floodlight check will be done again. After which the background will be re-grabbed and will replace the existing background array (held in RAM).

Phase B

Figure 21:
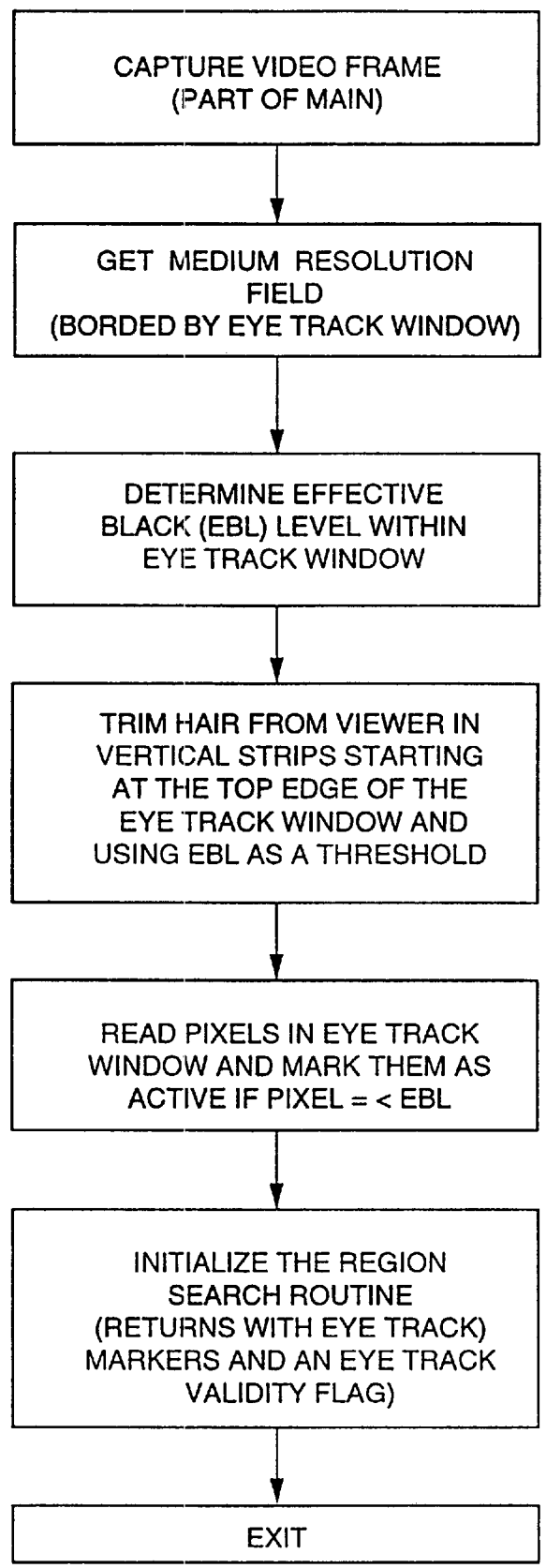
Figure 22:
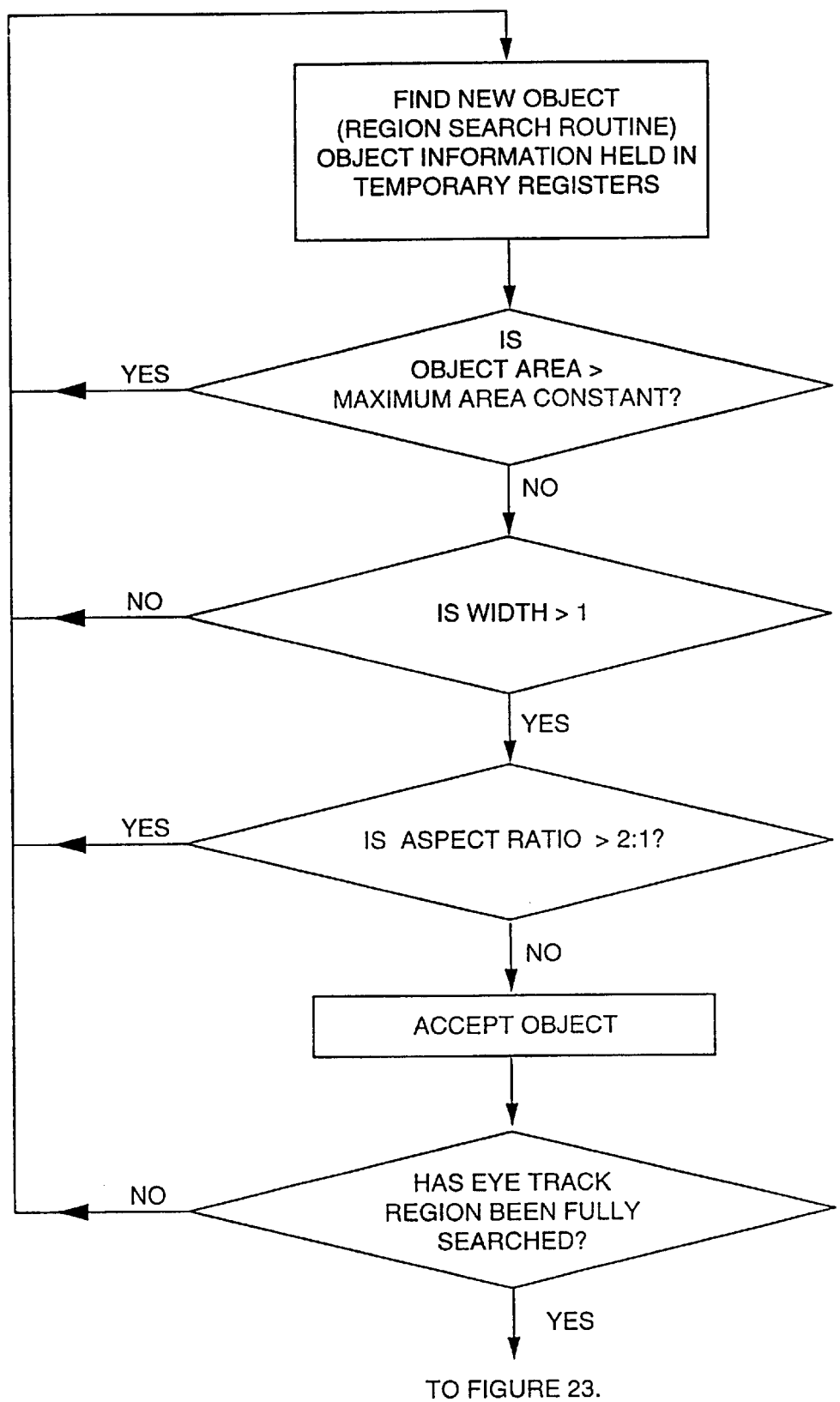

This phase of the analysis, as shown in FIG. 21, determines the position of the viewer's eyes. The basic assumption made within this routine is that the viewer's eyes will be darker than the surrounding facial tissue. This is a safe assumption because there seems to be very little reflection of infra-red light from the iris and retina. Even though this situation is present there is of course no guarantee that other parts of the image are not equally dark, for example hair, nostrils, mouth etc. The one main distinguishing feature is that the eyes should be dark with a bright surround.

The first step in the analysis is of course reading the video information from the frame store into the computer. As this information is being used to determine the eye position of the viewer it requires a higher resolution than that necessary for the head tracking section of the program. In this case a resolution of 150 * 140 (horizontal and vertical dots) was used although perhaps a slightly higher resolution on could be utilised to advantage.

It should be noted here that in all cases the full resolution of the frame grabber (600 * 280) is utilised and pixels are averaged i.e. each analysis pixel represents an average of an 8 pixel cluster (4 * 2 cluster). This averaging helps to reduce the influence of noise in the video signal and improves the results slightly. However, for a production grade machine this feature may be dropped in preference of reducing costs (by reducing the memory requirements of the frame-grabber component in the system).

It should be noted that the video information read in from the frame grabber in high resolution is from the same video field as the information read in low resolution for the head-tracking phase of the analysis.

The second step in the analysis is to determine the black-threshold level. This level is calculated from an analysis of the pixels found within the eye-track region (the region which is searched for eye-tracking). In the case of the existing software this level was calculated by searching all of the pixels to find the minimum and maximum levels. The black-level is then assigned as the mid point between these extremes, but other superior processes may be adopted in the future.

The third step in the analysis is the detection of the dark regions. This is done firstly on a pixel by pixel basis by comparing the video level against the black-threshold level. If the foreground pixel is darker than this level it is considered active, if not, then it is considered inactive and ignored.

One of the biggest problems associated with this eye-tracking technique was the problem of dark hair being falsely detected and formed into a single large region. It was found that many of these problems could be solved by trimming the image of the hair from the viewer. This is possible because the eye-track region falls within the outline of the viewer's head and thus cuts the hairline. Given this fact it is then a simple task to trim away the hair in strips starting at the border of the eye-track window and continuing until the adjacent pixel is no longer considered active (i.e. dark enough). Although such a trimming routine could be implemented starting on all of the sides of the eye track region (not including the bottom edge) it was found that such an approach did not yield significantly better results and in some cases yielded poorer results than simply utilising a single trimming routine that read in vertical strips starting at the top of the eye track region. In these cases failure occurred because the viewer's eyebrow was touching their hairline and as a result the horizontal trimming routine was removing part or all of the image of the viewer's eye because of the false assumption that it was a continuation of the hairline. For these reasons a single trimming routine was utilised.

After the trimming process is complete the remaining pixels in the eye track region are analysed and classified as either "active" or "inactive" as discussed earlier. The "active" pixels are then tagged as active and placed in an activity array for the region searching routine to work with.

In the next step a region search routine scans the activity array for active pixels. These pixels are then formed into groups using a region searching routine.

The region search routine (shown simplified in FIG. 22) returns a list of information about the objects (regions) that it has found. At the present this information consists of the left-most x coordinate, the right-most x coordinate, the top-most y coordinate, the bottom-most y coordinate and the area of the region in pixels.

Several constraints are placed on the generation of "valid" objects. Some of these are:

1) area 2) width 3) aspect ratio

Objects are considered invalid and are ignored if any of the following conditions occur.

a) the area is too great (the object is probably a clump of hair that got past the trimming routine or possibly a shadow), b) the object has a width of 1 (this is probably a strip of hair), c) the aspect ratio is greater than 2:1 (height to width) this indicates that the object is probably not an eye as the aspect ratio of an eye is rarely greater than 1:1.

The objects that meet all of these requirements are then placed in a queue for the next level of the analysis.

This next level of analysis is one of "filtering". In this stage, tests are performed first on single objects and then on pairs of objects to attempt to discriminate valid eye-pairs from false objects and object pairs.

Figure 23A:
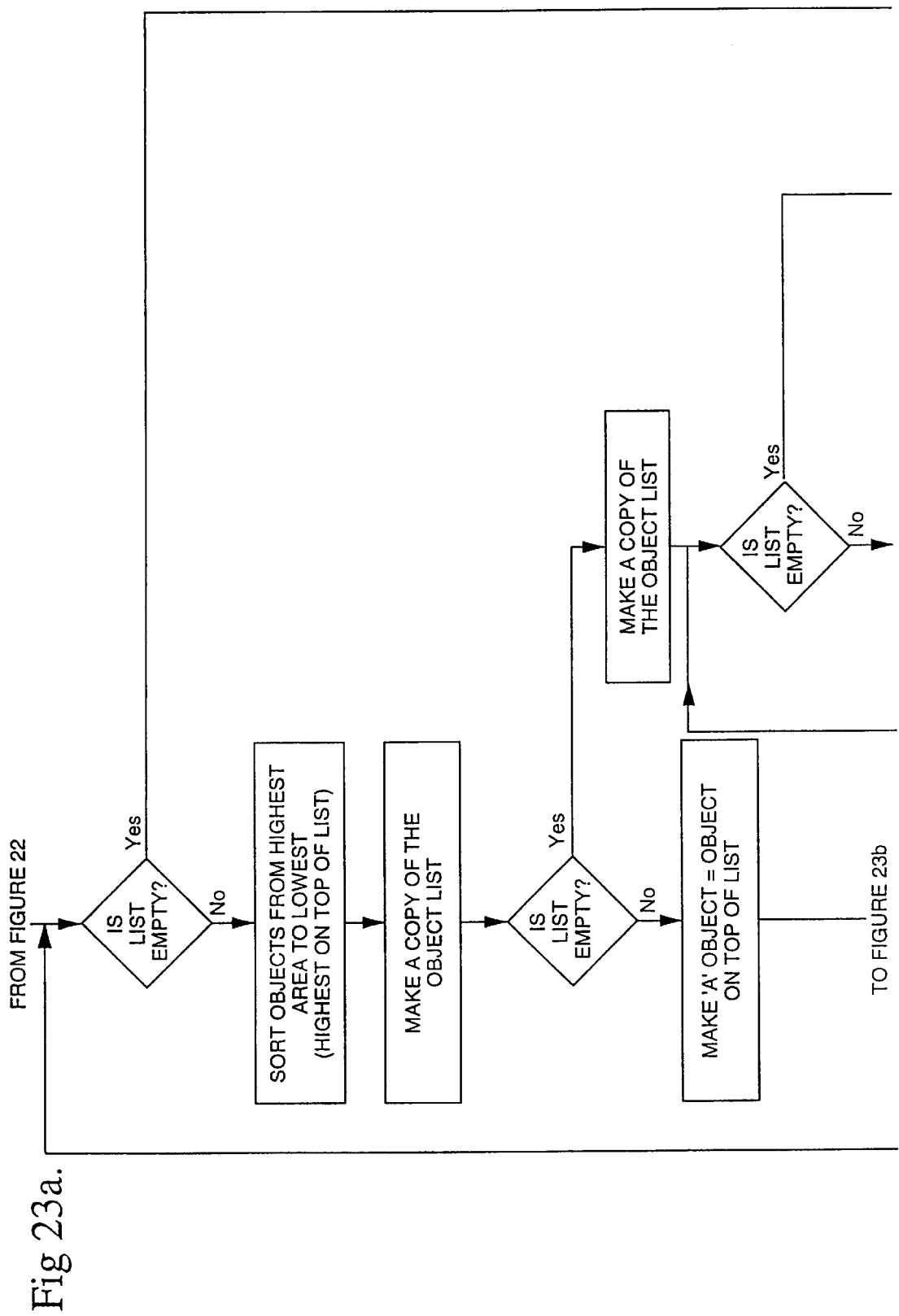
Figure 23B:
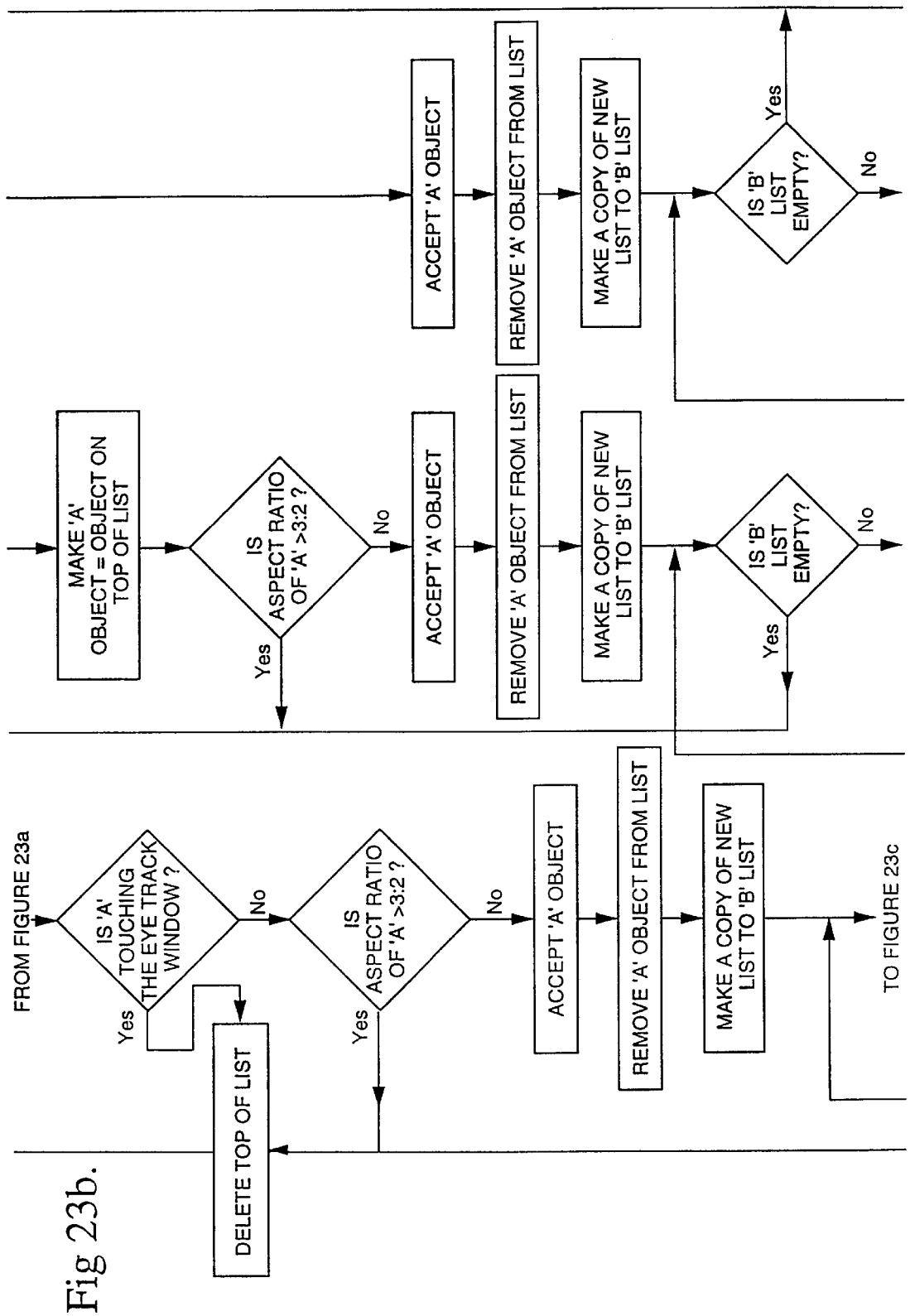
Figure 23C:
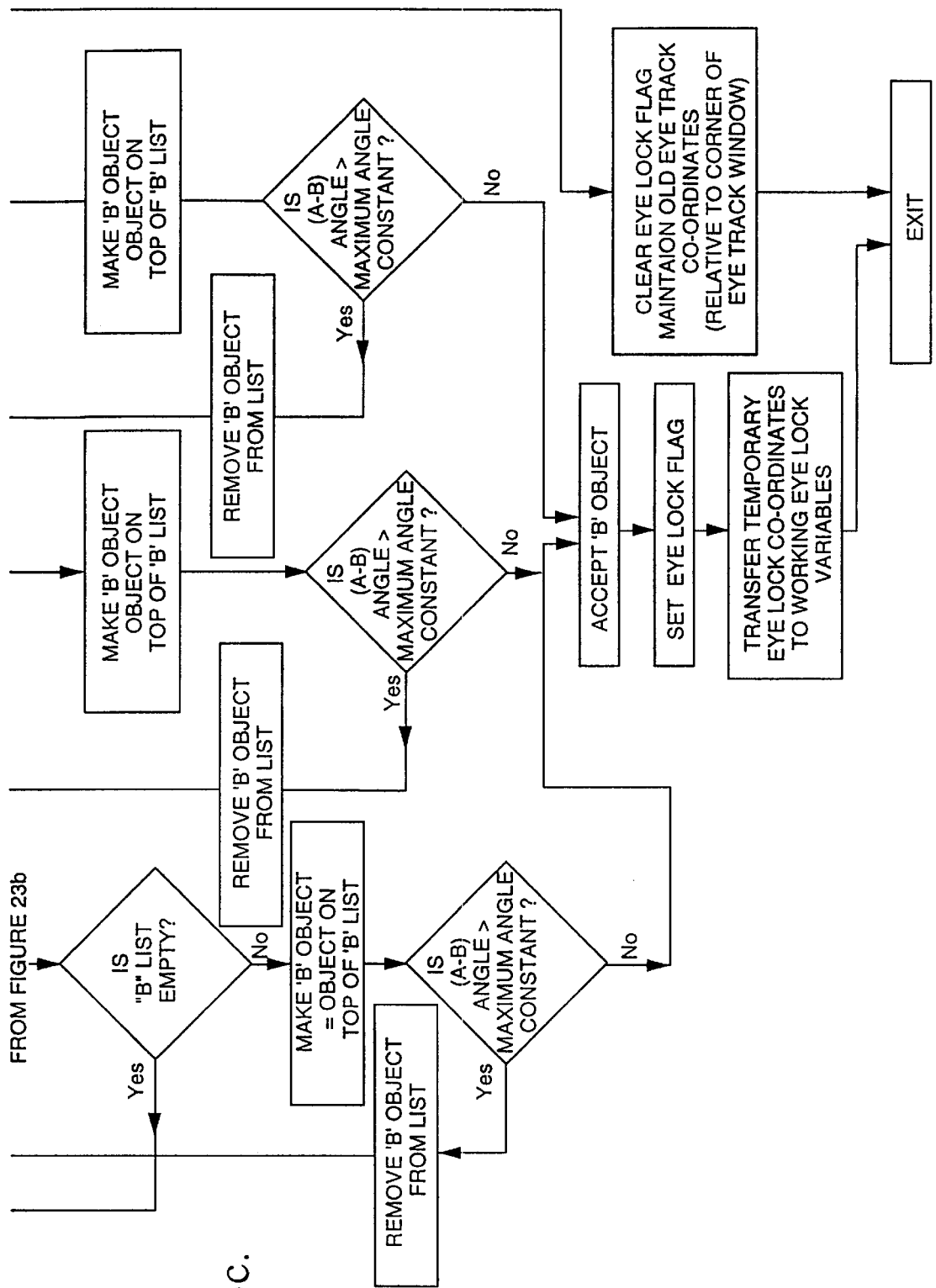

The filtering section which is shown in FIG. 23 is basically hierarchical with objects being ranked by their areas as the first criterion. They are stored into a list from largest to smallest then progressively removed from the list according to further geometric and inter-relational tests. The filtering is "adaptive" in nature in so much as it works on several dynamically variable levels of constraints or requirements. The filter starts off using the most stringent of the tests, then if no valid eye-pairs are found, reduces the constraints on the tests and re-tests the objects with this new set of requirements. If no valid eye-pairs are found then the test constraints are further reduced and the objects tested again. This pattern continues until a minimum constraint situation is met. If at this point no valid eye-pairs are found then the eye-lock flag is cleared and the previous eye positions are maintained.

The first stage in this filtering process is to sort the objects from largest to smallest. The largest object in the list is then chosen as the "A" object and the "A" object removed from the current list. This current list is then copied into a secondary list. The first item of this secondary list (i.e. the largest) is then checked as a potential "B" object and a series of checks performed on it. At present the following checks are performed:

1) touch (priority 3)
2) aspect (priority 2)
3) angle (priority 1)

In the touch test the object edges are checked to see if they are touching the eye-track window. This is an important test because it is quite common for the eye-track window to intersect the viewer's hairline thus creating a small isolated region which may from time to time get past the trim routine. it is however, not possible to simply ignore all objects that touch the eye-track window because it is quite common for a valid eye-region to do just this. This criterion has the lowest priority and if through its inclusion all object pairs are rejected then the test will re-start without the criterion. It should be noted that only the bottom and sides of the eye track window are tested in this manner. The top of the eye-track window does not need checking because the trim routine starts its checks along this edge and can thus almost guarantee that this top edge is clear after it has executed.

The next check (priority 2) is one of aspect ratio of the object. Although aspect ratio has already been checked at an earlier stage of the analysis, the threshold aspect ratio in the earlier case was 2:1. In this case the aspect ratio is checked against a lower (squarer) value of 3:2 (height to width). If the object has an aspect ratio greater than this value then it is rejected. It should be noted that this criterion could not simply be imposed at the earlier test of aspect ratio because it is often the case that the object is cut by the side of the eye-track window and thus appears to be of a higher aspect ratio than it actually is. Imposing this stricter aspect criterion is not a problem at this level because if it causes the rejection of valid eye-regions then the system will automatically drop this test criterion on the next pass through the filter loop.

In each case the entire list of "B" set points is checked for each level of filtering, ending, if necessary, by dropping filtering of priorities 3 and 2. As soon as a valid "B" point is found the "A–B" pair is then checked for angle. In this check the angle subtended between a line cutting the two points and the horizontal is calculated. If this angle is greater than a predetermined amount then the "B" point is rejected and the search for a new "B" point continues. The main purpose of this angle check is to eliminate the grouping of an object relating to the eye of a viewer with, for instance, their nostrils or mouth or in extreme cases pairing an eye with an eyebrow (of the same eye). This is the highest priority test in the filtering process but will, as with the others, be bypassed if through its inclusion causes the rejection of all "A–B" pairs.

As soon as a valid "A–B" pair is found, eye-lock is considered valid and the associated eye-lock flag is set.

FIG. 23 shows the filter program in straight-line code for clarity. It should be noted that the program may be implemented differently to improve compactness.

As indicated in FIG. 23 the eye positions are calculated as a relative offset from the head-tracking markers, thus it is possible to lose eye-lock and yet still maintain eye-positions even with viewer-movement as the eye-positions will then be "estimated" from the last known offsets from the head track markers. If however, the head-lock is lost, the eye-lock is automatically lost because the eye track window cannot be determined.

An auxiliary adaptive function in the eye-tracking section of the program allows the system to change the vertical offset between the top of the headtracking marker and the top of the eye-tracking region thereby making the system more versatile in the handling of viewers with different hair lengths and styles. This routine called "track" uses the relative offset between the centre of the eye-track region and the vertical position of the last valid eye-pair to alter the degree of vertical offset. This adjustment, or "tracking", can only occur while eye-lock is valid. If eye-lock is lost the eye-track window will slowly return to a centre position. The reasoning behind this approach is that if eye-lock is lost it is probably because the eye-tracking window has moved sufficiently far that it no longer encloses the viewer's eyes (such a situation can occur if the viewer moves their head very rapidly from up to down or vice versa). This self-centring allows the system to re-acquire a lock in such a situation.

It should be noted that many stereoscopic systems require the viewer to be positioned a fixed distance away from the display apparatus in order to perceive a 3D image. The single camera and light detector systems described above may be modified to utilise two cameras or light detectors such that each receives a slightly different view of the scene. By comparing the difference in position of the viewer in the output of both cameras or light detectors the distance from the viewer to the display apparatus can be calculated and acted upon accordingly.

Although infra-red light sources are referred to in the description it is also envisaged that alternative light sources may be used in the techniques described.

The claims defining the invention are as follows:

1. A tracking system for tracking a viewer of an autostereoscopic display system including:
    a background screen to assist in the tracking of said viewer;
    a first light source to illuminate said viewer;
    a capture means to capture an image and/or data of said viewer created by said background screen and said first light source;
    a processing means to determine the position of said viewer based on said image of said viewer captured by said capture means.

2. A tracking system according to claim 1 wherein the tracking is in at least one direction.

3. A tracking system as claimed in claim 1, wherein:
    said capture means includes a camera including a lens having an optical axis;
    said first light source is located near the optical axis of said lens, and
    said processing means receives information from said camera, wherein when the viewer is located in the front of said background screen and said viewer and said background screen is illuminated by said first light source, said camera views an image showing said viewer as a silhouette against said background screen, said processing means locating the boundary of the silhouette to thereby determine the location of the head of said viewer.

4. A tracking system according to claim 3 wherein said first light source emits infra-red light.

5. A tracking system according to claim 4 wherein said background screen is a retro reflective screen.

6. A tracking system according to claim 4 wherein said first light source includes an array of infra-red LEDs.

7. A tracking system according to claim 4 wherein an infra-red pass filter is located in front of said camera lens.

8. A tracking system according to claim 3 wherein said processing means includes a processing circuit for processing the signal from the camera, the circuit including a sync separator for separating horizontal and vertical sync pulses of the signal, and control means for reading the sync pulses and thereby determining the location of the boundary of the silhouette.

9. A tracking system for tracking a viewer of an auto-stereoscopic display system as claimed in claim 1, wherein
said background screen includes said first light source in the form of a light source array, and
said capture means includes a photo detector for detecting the light emitted from said light source array,
wherein when the viewer is located in front of said background screen, said viewer blocks the light emitted from a section of said light source array, the light from the unblocked section of said light source array being received by said photo detector to thereby allow for the determination of the location of the head of said viewer.

10. A tracking system according to claim 9 wherein said light source array emits coded light.

11. A tracking system for tracking a viewer of an auto-stereoscopic display system as claimed in claim 1, wherein
said first light source emits a plurality of parallel stripes of light,
said capture means includes a light detector, and
wherein when said viewer is located in front of said background screen and said parallel stripes are projected on said viewer and said background screen, said light detector receives the reflection of said parallel stripes and said processing means determines the location of said head of the viewer on the basis of parameters of the emitted light.

12. A tracking system according to claim 11 wherein said first light source emits vertical stripes of infra-red light.

13. A tracking system for tracking a viewer of an auto-stereoscopic display system as claimed in claim 1, wherein
said first light source emits a plurality of parallel stripes of light,
said capture means includes a light detector, and
wherein when said viewer is located in front of said first light source, said processing means determines the location of said head of the viewer by viewing the distortion of said reflected stripes.

14. A tracking system according to claim 13 wherein said light source emits vertical stripes of infra-red light.

15. A tracking system for an auto-stereoscopic display system as claimed in claim 1, wherein
said capture means includes a camera coupled to a lens, and
said first light source is located adjacent to said lens,
wherein when said viewer is located in front of said camera, light is emitted from said first light source towards said viewer, and light reflected from the eyes of said viewer is receivable by said camera to thereby determine the location of the eyes of said viewer.

16. A tracking system according to claim 15 wherein said lens is a pin hole lens.

17. A tracking system according to claim 15 wherein said first light source is an infra-red light source surrounding the lens.

18. A tracking system for tracking a viewer of an auto-stereoscopic display system as claimed in claim 1, wherein
said capture means includes a camera including a lens,
said first light source is located adjacent to said lens,
said tracking system further including a second light source located at a distance away from said lens, and
wherein when said viewer is at a viewer location aligned with the optical axis of the lens, light is separately emitted from said first and second light sources, the light source emitted from said second light source being reflected as matt and direct reflection from said viewer position, and the light emitted from said first light source being also reflected as matt and direct reflection from the viewer position and is further reflected as retroreflection from the eyes of said viewer, whereby said processing means determines the difference between the reflected light when said first and second light sources illuminate said viewer to thereby determine the location of the eyes of said viewer.

19. A tracking system according to claim 18 wherein said lens is a pin hole lens.

20. A tracking system according to claim 18, wherein said first and second light sources emit infra-red light.

21. A tracking system according to claim 20, wherein said first and second light sources are respectively provided by a circular array of infra-red LEDs located at least substantially concentrically about an optical axis of said lens.

22. A tracking system for tracking a viewer of an auto-stereoscopic display system as claimed in claim 1, wherein
said capture means includes a first camera having a first lens,
said first light source is located adjacent the optical axis of said first lens,
said system further including a second camera having a second lens, said second camera located adjacent to said first camera, said viewer is illuminated by the light emitted from said first light source, said second camera receives matt and direct reflection from said viewer and said first camera receives matt and direct reflection from said viewer and further receives retroreflectivity from the eyes of said viewer.

23. A tracking system according to claim 22 further including a beam splitting means for splitting the image received by each lens, and a light source adjacent to the optical axis of one of the lenses.

24. A tracking system according to claim 23 wherein said light source is an array of infra-red LEDs arranged in a semicircular arrangement about the optical axis of one of the lenses.

25. A tracking system according to claim 22 further including optical band pass filters, and first and second light sources emitting light of differing wavelengths.

26. A tracking system according to claim 25 wherein said first and second light sources are provided by LED arrays.

27. A tracking system according to claim 26 wherein said first and second light sources are respectively provided by a circular array of LEDs located at least substantially concentrically about an optical axis of one of the lens.

28. A tracking system according to claim 22 including light polarising means located in front of the light source.

29. A tracking system for tracking a viewer of an auto-stereoscopic display as claimed in claim 1, wherein
said capture means includes a camera having a lens, and a light polarising means respectively located in front of said camera and said light source whereby polarised light is reflected from said viewer to said camera.

30. A display arrangement including two tracking systems according to claim 1.

31. A method of tracking a viewer of an auto-stereoscopic display system having a tracking system including a background screen, a camera including a lens having an optical axis, and a light source located adjacent the optical axis of the lens, the method including locating the viewer in front of the background screen and illuminating the viewer and the background screen with the light emitted from the light source, such that the viewer is viewed as a silhouette against a background screen by the camera, and locating the boundary of the silhouette to thereby determine the location of the head of the viewer.

32. A tracking system for tracking a viewer of an auto-stereoscopic display system as claimed in claim 1, wherein
said background screen includes a photo detector array, and
wherein when said viewer is located in front of said background screen and said viewer and said background screen is illuminated by said first light source, a shadow is cast by said viewer on said background screen blocking light from a section of said array, to thereby determine the location of the head of said viewer.

33. A tracking system according to claim 32 wherein said first light source emits infra-red light.

34. A tracking system according to claim 33 wherein said first light source is an array of infra-red LEDs.

35. A tracking system according to claim 33 wherein said first light source emits coded light.

36. A method of tracking a viewer of an auto-stereoscopic display system having a tracking system including a background screen providing a photo detector array and a light source illuminating the background screen, including locating the viewer in front of the background screen, illuminating the background screen and the viewer such that a shadow of the viewer falls on the photo detector array to thereby determine the location of the head of the viewer.

37. A method of tracking a viewer of an auto-stereoscopic display system having a tracking system including a background screen providing a light source array and a photo detector for detecting the light emitted from the light source array, including locating the viewer in front of the light source array, the viewer blocking the light emitted from a section from the light source array, and receiving the light emitted from the unblocked section of the light source array by the photo detector to thereby allow the location of the head of the viewer to be determined.

38. A method of tracking a viewer of an auto-stereoscopic display system having a tracking system including a background screen, and a light source for emitting a plurality of parallel stripes of light, and a light detector including locating the viewer in front of the background screen, emitting the parallel stripes of light, receiving the reflection of the stripes of light by the light detector and determining the location of the head of the viewer on the basis of parameters of the parallel stripes.

39. A method according to claim 38 wherein said light source emits vertical stripes of infra-red light.

40. A method according to claim 38 wherein the parameters include the time coding and modulation of the stripes.

41. A method of tracking a viewer of an auto-stereoscopic display system having a tracking system including a light source emitting a plurality of parallel stripes of light, and a light detector including projecting the infra-red light stripes on the viewer and determining the location of the head of the viewer as a function of the distortion of the reflected light stripe.

42. A method according to claim 41 wherein the light source emits vertical stripes of infra-red light.

43. A method of tracking a viewer of an auto-stereoscopic display system when located at a viewer position having a tracking system including a camera having a lens directed towards the viewer position, a first light source located adjacent the lens and a second light source located at a distance from the lens, including emitting light from the first light source towards the viewer, the light from the first light source being reflected as matt and direct reflection from the viewer position and is further reflected as retroreflection from the eyes of the viewer, emitting light from the second light source towards the viewer, the light emitted from the second light source being reflected as matt and direct reflection from the viewer position and determining the difference between the light reflected from the viewer when respectively illuminated by the first and second light sources to thereby locate the eyes of the viewer.

44. A method of tracking a viewer of an auto-stereoscopic display system having a tracking system including a first camera having a first lens, a light source located adjacent the optical axis of the first lens, and a second camera having a second lens, the second camera being located adjacent the first camera, the optical axis of the second lens being angularly displaced relative to the optical axis of the first lens, including:
directing the first camera towards the viewer, simultaneously receiving light reflected from the viewer in the first and second cameras, whereby the first camera further receives light reflected from the eyes of the viewer, and determining the difference between the reflected light received by the first and second cameras to thereby determine the location of the eyes of the viewer.

45. A method of tracking a viewer of an auto-stereoscopic display system having a display system including a video camera, a store means for storing video fields provided by the camera, and a processing means for processing the stored video fields, including:
a) comparing the difference between a said video field of a background and a said video field of the viewer located in front of the background to thereby locate the head of the viewer,
b) processing the video field including the viewer within an eye track region thereof to search for relatively dark objects therein,
c) assessing each of the objects on the basis of predetermined criteria to thereby select the objects likely to be the eyes of the viewer.

46. A method according to claim 45 wherein a trimming process is conducted at the top of the eye track region to thereby remove the hair line of the viewer from the eye track region being processed.

* * * * *